(12) United States Patent
Kuang et al.

(10) Patent No.: US 11,071,092 B2
(45) Date of Patent: Jul. 20, 2021

(54) RESPONSE MESSAGE TRANSMISSION METHOD AND APPARATUS

(71) Applicant: Huawei Technologies Co., Ltd., Shenzhen (CN)

(72) Inventors: Yiru Kuang, Beijing (CN); Haibo Xu, Beijing (CN); Yongbo Zeng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 116 days.

(21) Appl. No.: 16/338,635

(22) PCT Filed: Sep. 30, 2016

(86) PCT No.: PCT/CN2016/101317
§ 371 (c)(1),
(2) Date: Apr. 1, 2019

(87) PCT Pub. No.: WO2018/058636
PCT Pub. Date: Apr. 5, 2018

(65) Prior Publication Data
US 2019/0357177 A1   Nov. 21, 2019

(51) Int. Cl.
*H04W 76/11* (2018.01)
*H04W 88/04* (2009.01)
(Continued)

(52) U.S. Cl.
CPC ............ *H04W 72/02* (2013.01); *H04W 76/11* (2018.02); *H04W 76/27* (2018.02); *H04W 76/28* (2018.02); *H04W 88/023* (2013.01); *H04W 88/04* (2013.01)

(58) Field of Classification Search
CPC ..... H04W 24/10; H04W 36/08; H04W 72/02; H04W 76/11; H04W 88/04
(Continued)

(56) References Cited

U.S. PATENT DOCUMENTS 10,085,197 B1 * 9/2018 Mansour .......... H04W 28/0268
10,314,057 B1 * 6/2019 Oroskar ................. H04W 4/33
(Continued)

FOREIGN PATENT DOCUMENTS

CN          1846371 A     10/2006
CN        101141173 A      3/2008
(Continued)

OTHER PUBLICATIONS

Machine Translation and Abstract of Chinese Publication No. CN101141173, Mar. 12, 2008, 20 pages.
(Continued)

*Primary Examiner* — Angel T Brockman
(74) *Attorney, Agent, or Firm* — Conley Rose, P.C.

(57) ABSTRACT

In the embodiments of the present invention, a base station can determine a relay communication period of remote user equipment by using indication information carried in a resource request of relay user equipment or by using a resource request of the remote user equipment, and allocate a resource in the relay communication period to the relay user equipment, so that the relay user equipment returns a response message to the remote user equipment by using the resource. Therefore, for a request message sent by the remote user equipment, it can be ensured that the relay user equipment returns, in the relay communication period, a response message corresponding to the request message to the remote user equipment, to avoid a case in which the remote user equipment cannot detect the response message, and to reduce a failure probability of a service requested by the remote user equipment.

20 Claims, 16 Drawing Sheets

(51) Int. Cl.
*H04W 72/02* (2009.01)
*H04W 76/28* (2018.01)
*H04W 76/27* (2018.01)
*H04W 88/02* (2009.01)

(58) Field of Classification Search
USPC .......................................................... 455/438
See application file for complete search history.

(56) References Cited

U.S. PATENT DOCUMENTS

| | | | |
|---|---|---|---|
| 2005/0048914 A1 | 3/2005 | Sartori et al. | |
| 2010/0265874 A1 | 10/2010 | Palanki et al. | |
| 2014/0094180 A1 | 4/2014 | Zhou et al. | |
| 2015/0172387 A1 | 6/2015 | Ge et al. | |
| 2015/0271870 A1 | 9/2015 | Agiwal et al. | |
| 2015/0341974 A1 | 11/2015 | Wu et al. | |
| 2017/0118793 A1* | 4/2017 | Liu | H04W 76/16 |
| 2018/0054804 A1 | 2/2018 | Luo et al. | |
| 2019/0053127 A1* | 2/2019 | Jung | H04W 48/08 |

FOREIGN PATENT DOCUMENTS

| | | | | |
|---|---|---|---|---|
| CN | 103200634 | * | 1/2012 | ............ H04W 28/10 |
| CN | 103650624 A | | 3/2014 | |
| CN | 105050204 A | | 11/2015 | |
| CN | 105307234 A | | 2/2016 | |
| CN | 105794124 A | | 7/2016 | |
| EP | 2942993 A1 | | 11/2015 | |
| WO | 2016138822 A1 | | 9/2016 | |

OTHER PUBLICATIONS

Machine Translation and Abstract of Chinese Publication No. CN105307234, Feb. 3, 2016, 23 pages.
Foreign Communication From a Counterpart Application, Chinese Application No. 201680089576.7, Chinese Office Action dated Dec. 3, 2019, 10 pages.
Foreign Communication From a Counterpart Application, European Application No. 16917386.1, Extended European Search Report dated Jul. 22, 2019, 10 pages.
Machine Translation and Abstract of Chinese Publication No. CN105050204, Nov. 11, 2015, 28 pages.
Foreign Communication From a Counterpart Application, PCT Application No. PCT/CN2016/101317, English Translation of International Search Report dated Jun. 23, 2017, 2 pages.
Foreign Communication From a Counterpart Application, PCT Application No. PCT/CN2016/101317, English Translation of Written Opinion dated Jun. 23, 2017, 4 pages.

* cited by examiner

RESPONSE MESSAGE TRANSMISSION METHOD AND APPARATUS

CROSS-REFERENCE TO RELATED APPLICATIONS

This application is a national stage of International Application No. PCT/CN2016/101317, filed on Sep. 30, 2016, which is hereby incorporated by reference in its entirety.

TECHNICAL FIELD

The present invention relates to the field of wireless communications technologies, and more specifically, to a response message transmission method and apparatus.

BACKGROUND

As wireless communications terminals are applied to a growing quantity of scenarios, a user equipment-to-network relay (English: UE-to-Network relay, where UE is an acronym of user equipment) technology appears. In the UE-to-Network relay technology, remote user equipment (English: remote UE) accesses a base station by using relay user equipment (English: relay UE). For example, in some application scenarios, the relay user equipment may be an intelligent terminal such as a mobile phone, the remote user equipment may be an intelligent wearable device such as an electronic band, and the intelligent wearable device may access the base station by using the intelligent terminal as a relay.

In a process in which the remote user equipment communicates with the relay user equipment, sometimes the remote user equipment sends a request message to the relay user equipment, and the relay user equipment needs to send a response message to the remote user equipment after receiving the request message. For example, in a relay discovery process, the remote user equipment broadcasts a request message, and relay user equipment that can receive the request message returns a response message to the remote user equipment. In this way, the remote user equipment can determine nearby available relay user equipment by using the response message.

The inventor finds through research that in a process in which remote user equipment communicates with a base station by using relay user equipment, because many remote user equipments each have only one receive radio frequency link, the remote user equipment cannot communicate with the base station and the relay user equipment at the same time. Therefore, two communication periods, namely, a base station communication period and a relay communication period, are usually configured for the remote user equipment. The base station communication period is used by the remote user equipment to communicate with the base station user equipment, and the relay communication period is used by the remote user equipment to communicate with the relay user equipment. However, for a request message sent by the remote user equipment, the relay user equipment usually returns a response message to the remote user equipment in the base station communication period of the remote user equipment, but the remote user equipment does not listen to, in the base station communication period of the remote user equipment, a message sent by the relay user equipment. As a result, the response message returned by the relay user equipment usually cannot be detected by the remote user equipment, and a failure probability of a service requested by the remote user equipment increases.

SUMMARY

A technical problem to be resolved in this application is to provide a response message transmission method and apparatus, so as to ensure that for a request message sent by remote user equipment, relay user equipment returns a response message to the remote user equipment in a relay communication period of the remote user equipment, avoid a case in which the remote user equipment cannot detect the response message, and reduce a failure probability of a service requested by the remote user equipment.

According to a first aspect, a response message transmission method is provided, and includes:

receiving, by relay user equipment, a request message sent by remote user equipment, where the request message carries indication information;

sending, by the relay user equipment to a base station, a resource request carrying the indication information, so that the base station determines a relay communication period of the remote user equipment according to the indication information, and allocates a first initial resource in the relay communication period to the relay user equipment; and determining, by the relay user equipment, a first target resource based on the first initial resource, and sending a response message corresponding to the request message to the remote user equipment by using the first target resource.

According to a second aspect, a response message transmission method is provided, and includes:

receiving, by a base station, a resource request sent by relay user equipment, where the resource request is triggered by the relay user equipment when the relay user equipment receives a request message sent by remote user equipment, and both the resource request and the request message carry indication information;

determining, by the base station, a relay communication period of the remote user equipment according to the indication information; and allocating, by the base station, an initial resource in the relay communication period to the relay user equipment, so that the relay user equipment determines a target resource based on the initial resource, and sends a response message corresponding to the request message to the remote user equipment by using the target resource.

According to a third aspect, a response message transmission method is provided, and includes:

sending, by remote user equipment to relay user equipment, a request message carrying indication information, where the request message is used to trigger the relay user equipment to send, to a base station, a resource request carrying the indication information, and the resource request is used to trigger the base station to determine a relay communication period of the remote user equipment according to the indication information, and allocate an initial resource in the relay communication period to the relay user equipment; and receiving, by the remote user equipment, a response message that is sent by the relay user equipment by using a target resource, where the response message corresponds to the request message, and the target resource is determined by the relay user equipment based on the initial resource.

According to a fourth aspect, a response message transmission method is provided, and includes:

sending, by remote user equipment, a resource request to a base station, so that the base station determines a relay communication period of the remote user equipment based on the remote user equipment corresponding to the resource request, and allocates a first target resource and an initial resource that is in the relay communication period to the remote user equipment;

sending, by the remote user equipment to relay user equipment based on a stored identifier of the relay user equipment and by using the first target resource, a request message carrying the initial resource, so that the relay user equipment determines the second target resource based on the initial resource; and receiving, by the remote user equipment, a response message that is sent by the relay user equipment by using the second target resource, where the response message corresponds to the request message.

According to a fifth aspect, a response message transmission method is provided, and includes:

receiving, by a base station, a resource request sent by remote user equipment;

determining, by the base station, a relay communication period of the remote user equipment based on the remote user equipment corresponding to the resource request; and allocating, by the base station, a first target resource and an initial resource that is in the relay communication period to the remote user equipment, where the first target resource is used by the remote user equipment to send, to relay user equipment based on a stored identifier of the relay user equipment, a request message carrying the initial resource, the initial resource is used by the relay user equipment to determine a second target resource, and the second target resource is used by the relay user equipment to send a response message corresponding to the request message to the remote user equipment.

According to a sixth aspect, a response message transmission method is provided, and includes:

receiving, by relay user equipment, a request message that is sent by remote user equipment by using a first target resource, where the request message carries an initial resource, the first target resource and the initial resource are allocated by a base station to the remote user equipment when the base station receives a resource request sent by the remote user equipment, the initial resource belongs to a relay communication period of the remote user equipment, and the relay communication period is determined by the base station based on the remote user equipment corresponding to the resource request; and determining, by the relay user equipment, a second target resource based on the initial resource, and sending a response message corresponding to the request message to the remote user equipment by using the second target resource.

According to a seventh aspect, a response message transmission apparatus is provided. The response message transmission apparatus is configured on relay user equipment and includes:

a receiving unit, configured to receive a request message sent by remote user equipment, where the request message carries indication information;

a first sending unit, configured to send, to a base station, a resource request carrying the indication information, so that the base station determines a relay communication period of the remote user equipment according to the indication information, and allocates a first initial resource in the relay communication period to the relay user equipment;

a determining unit, configured to determine a first target resource based on the first initial resource; and a second sending unit, configured to send a response message corresponding to the request message to the remote user equipment by using the first target resource.

According to an eighth aspect, a response message transmission apparatus is provided. The response message transmission apparatus is configured on a base station and includes:

a receiving unit, configured to receive a resource request sent by relay user equipment, where the resource request is triggered by the relay user equipment when the relay user equipment receives a request message sent by remote user equipment, and both the resource request and the request message carry indication information;

a determining unit, configured to determine a relay communication period of the remote user equipment according to the indication information; and an allocation unit, configured to allocate an initial resource in the relay communication period to the relay user equipment, so that the relay user equipment determines a target resource based on the initial resource, and sends a response message corresponding to the request message to the remote user equipment by using the target resource.

According to a ninth aspect, a response message transmission apparatus is provided. The response message transmission apparatus is configured on remote user equipment and includes:

a sending unit, configured to send, to relay user equipment, a request message carrying indication information, where the request message is used to trigger the relay user equipment to send, to a base station, a resource request carrying the indication information, and the resource request is used to trigger the base station to determine a relay communication period of the remote user equipment according to the indication information, and allocate an initial resource in the relay communication period to the relay user equipment; and a receiving unit, configured to receive a response message that is sent by the relay user equipment by using a target resource, where the response message corresponds to the request message, and the target resource is determined by the relay user equipment based on the initial resource.

According to a tenth aspect, a response message transmission apparatus is provided. The response message transmission apparatus is configured on remote user equipment and includes:

a first sending unit, configured to send a resource request to a base station, so that the base station determines a relay communication period of the remote user equipment based on the remote user equipment corresponding to the resource request, and allocates a first target resource and an initial resource that is in the relay communication period to the remote user equipment;

a second sending unit, configured to send, to relay user equipment based on a stored identifier of the relay user equipment and by using the first target resource, a request message carrying the initial resource, so that the relay user equipment determines the second target resource based on the initial resource; and a receiving unit, configured to receive a response message that is sent by the relay user equipment by using the second target resource, where the response message corresponds to the request message.

According to an eleventh aspect, a response message transmission apparatus is provided. The response message transmission apparatus is configured on a base station and includes:

a receiving unit, configured to receive a resource request sent by remote user equipment;

a determining unit, configured to determine a relay communication period of the remote user equipment based on the remote user equipment corresponding to the resource request; and an allocation unit, configured to allocate a first target resource and an initial resource that is in the relay communication period to the remote user equipment, where the first target resource is used by the remote user equipment to send, to relay user equipment based on a stored identifier of the relay user equipment, a request message carrying the initial resource, the initial resource is used by the relay user equipment to determine a second target resource, and the second target resource is used by the relay user equipment to send a response message corresponding to the request message to the remote user equipment.

According to a twelfth aspect, a response message transmission apparatus is provided. The response message transmission apparatus is configured on relay user equipment and includes:

a receiving unit, configured to receive a request message that is sent by remote user equipment by using a first target resource, where the request message carries an initial resource, the first target resource and the initial resource are allocated by a base station to the remote user equipment when the base station receives a resource request sent by the remote user equipment, the initial resource belongs to a relay communication period of the remote user equipment, and the relay communication period is determined by the base station based on the remote user equipment corresponding to the resource request;

a determining unit, configured to determine a second target resource based on the initial resource; and a sending unit, configured to send a response message corresponding to the request message to the remote user equipment by using the second target resource.

In this application, the base station can determine the relay communication period of the remote user equipment by using the indication information carried in the resource request of the relay user equipment or by using the resource request of the remote user equipment, and allocate the resource in the relay communication period to the relay user equipment, so that the relay user equipment returns the response message to the remote user equipment by using the resource. Therefore, for the request message sent by the remote user equipment, it can be ensured that the relay user equipment returns, in the relay communication period, the response message corresponding to the request message to the remote user equipment, to avoid a case in which the remote user equipment cannot detect the response message, and to reduce a failure probability of a service requested by the remote user equipment.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

Figure 1:
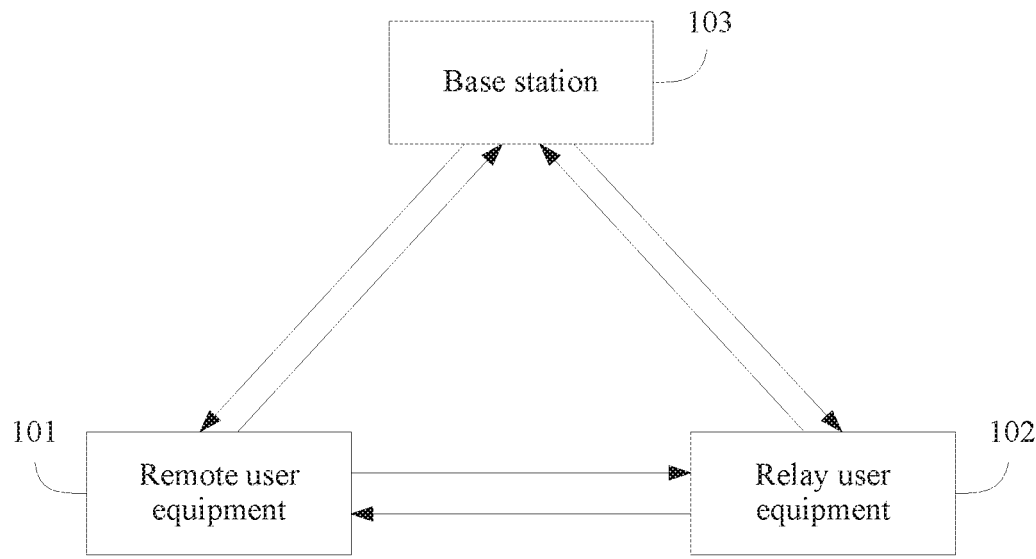
FIG. 1 is a schematic diagram of a network system framework in an application scenario according to an embodiment of the present invention.

The inventor finds through research that after receiving a request message sent by remote user equipment, relay user equipment needs to send a response message to the remote user equipment by using a resource that is allocated by a base station. However, when allocating, to the relay user equipment, the resource used for sending the response message, the base station does not know the remote user equipment configured to receive the response message. As a result, it cannot be ensured that the resource allocated by the base station to the relay user equipment is definitely a resource in a relay communication period of the remote user equipment. In addition, even though the base station allocates a plurality of resources to the relay user equipment for selection, because the relay user equipment does not know a communication period configuration status of the remote user equipment, in other words, the relay user equipment does not know the relay communication period of the remote user, it cannot be ensured that a resource selected by the relay user equipment to return the response message is definitely a resource in the relay communication period of the remote user equipment. It can be teamed that a case in which the relay user equipment returns the response message to the remote user equipment by using a resource in a base station communication period of the remote user equipment cannot be avoided. As a result, the relay user equipment often returns the response message to the remote user equipment in the base station communication period of the remote user equipment, but the remote user equipment does not listen to, within the base station communication period of the remote user equipment, a message sent by the relay user equipment. Consequently, the response message returned by the relay user equipment usually cannot be detected by the remote user equipment, thereby increasing a failure probability of a service requested by the remote user equipment.

Based on this, in one aspect of embodiments of the present invention, when relay user equipment requests a base station to allocate a resource used for sending a response message, a resource request sent by the relay user equipment may carry indication information sent by remote user equipment, and the indication information may be used by the base station to determine a relay communication period of the remote user equipment. In this way, it can be ensured that the base station allocates, from a resource in the relay communication period of the remote user equipment and according to the indication information, the resource used by the relay user equipment to send the response message. In another aspect of the embodiments of the present invention, when requesting a base station to allocate a resource used for sending a request message, remote user equipment also requests a resource used for sending a response message. The base station may allocate, to the remote user equipment based on a resource request of the remote user equipment, the resource used for sending the request message and the resource used for sending the response message, and then the remote user equipment sends, to relay user equipment, the resource used for sending the response message. Because the resource request sent by the remote user equipment may be used by the base station to determine a relay communication period of the remote user equipment, it can be ensured that the base station allocates, from a resource in the relay communication period of the remote user equipment and according to the resource request sent by the remote user equipment, the resource used for sending the response message. It can be learned that the base station can determine the relay communication period of the remote user equipment by using the indication information carried in the resource request of the relay user equipment or by using the resource request of the remote user equipment, and it can be ensured that the resource allocated to the relay user equipment for sending the response message is definitely a resource in the relay communication period of the remote user equipment. Therefore, it can be ensured that the relay user equipment returns, in the relay communication period of the remote user equipment, the response message corresponding to the request message to the remote user equipment, to avoid a case in which the remote user equipment cannot detect the response message, and to reduce a failure probability of a service requested by the remote user equipment.

For example, one scenario of the embodiments of the present invention may be applied to a network system shown in FIG. 1. In the network system, remote user equipment 101 may communicate with relay user equipment 102, the relay user equipment 102 may communicate with a base station 103, and the remote user equipment 101 may communicate with the base station 103.

Based on the network system shown in FIG. 1, in an example, the remote user equipment 101 may send, to the relay user equipment 102, a request message carrying indication information. The relay user equipment 102 may obtain the indication information from the request message, and send, to the base station 103, a resource request carrying the indication message, to request the base station 103 to allocate a resource used for sending a response message. After receiving the resource request, the base station 103 may determine a relay communication period of the remote user equipment 101 according to the indication information, and allocate a first initial resource in the relay communication period to the relay user equipment 102. After receiving the first initial resource, the relay user equipment 102 may determine a first target resource based on the first initial resource, and send the response message corresponding to the request message to the remote user equipment 101 by using the first target resource.

Based on the network system shown in FIG. 1, in another example, the remote user equipment 101 may send a resource request to the base station 103, to request the base station 103 to allocate a resource used for sending a request message and a resource used for sending a response message. The base station 103 may determine a relay communication period of the remote user equipment 101 according to the resource request, and allocate a first target resource and an initial resource that is in the relay communication period to the remote user equipment 101. After receiving the first target resource and the initial resource, the remote user equipment 101 may send, to relay user equipment based on a stored identifier of the relay user equipment and by using the first target resource, the request message carrying the initial resource. After receiving the request message, the relay user equipment 102 may determine a second target resource based on the initial resource, and send the response message corresponding to the request message to the remote user equipment 101 by using the second target resource.

It may be understood that the foregoing scenario is merely an example scenario provided in the embodiments of the present invention, and the embodiments of the present invention are not limited to the scenario.

It should be noted that in the embodiments of the present invention, the used term "resource" may be alternatively referred to as a time-frequency resource, and may specifically represent a time-frequency location used for information transmission. In the descriptions of the embodiments of the present invention, allocating a "resource" used for sending a "message" means configuring a time-frequency location represented by the "resource" to send the "message". Sending a "resource" means sending an identifier of a time-frequency location represented by the "resource". Sending a "message" by using a "resource" means sending the "message" on a time-frequency location represented by the "resource". The "resource" may be a resource used for sending a request message, or may be a resource used for sending a response message, or may be another resource. The "message" may be a request message, or may be a response message, or may be another message.

In addition, in a base station communication period, remote user equipment may communicate with a base station over a cellular link. In a relay communication period, the remote user equipment may communicate with relay user equipment over a sidelink. The base station may be, for example, an evolved Node B (English: Evolutional Node B, eNB for short).

Specific implementations of a response message transmission method and a related device in the embodiments of the present invention are described in detail below with reference to the accompanying drawings and by using embodiments.

Figure 2:
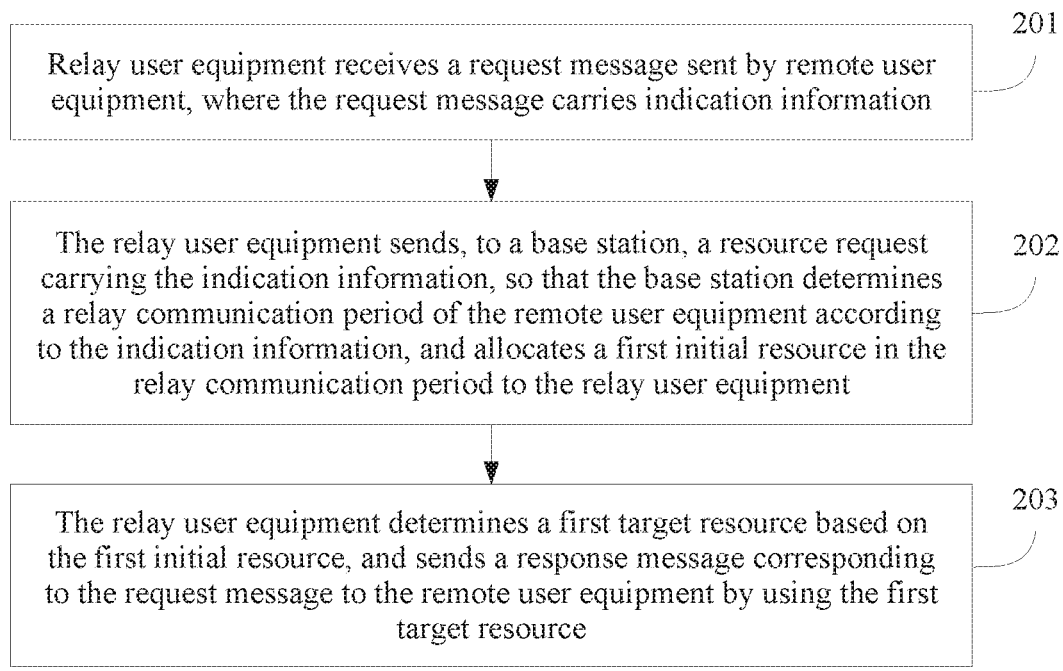
FIG. 2 is a schematic flowchart of a response message transmission method according to an embodiment of the present invention.

FIG. 2 is a schematic flowchart of a response message transmission method according to an embodiment of the present invention. The method in this embodiment is described from the perspective of relay user equipment. A resource request sent by the relay user equipment carries indication information sent by remote user equipment, and the indication information may be used to determine a relay communication period of the remote user equipment. Specifically, the method in this embodiment may include, for example, the following steps.

201. The relay user equipment receives a request message sent by the remote user equipment, where the request message carries indication information.

During specific implementation, the remote user equipment may send a resource request corresponding to the request message to a base station, to request the base station to allocate a resource used for sending the request message. After allocating, for the resource request, the resource used for sending the request message, the base station may send, to the remote user equipment, the resource used for sending the request message. After receiving the resource used for sending the request message, the remote user equipment may send the request message to the relay user equipment on a time-frequency location represented by the resource, so that the relay user equipment receives the request message. It may be understood that to request the base station to allocate the resource used for sending the request message, the remote user equipment communicates with the base station. Therefore, the remote user equipment is in a Radio Resource Control (English: Radio Resource Control, RRC for short) connected mode in this case.

The resource request corresponding to the request message may be specifically embedded to sidelink user equipment information (English: Sidelink UE Information) for sending. In other words, the sidelink UE information sent by the remote user equipment to the base station carries the resource request corresponding to the request message. The resource used for sending the request message may be specifically embedded to Radio Resource Control connection reconfiguration (English: RRC Connection Reconfiguration) information. In other words, the RRC connection reconfiguration sent by the base station to the remote user equipment carries the resource used for sending the request message.

It should be noted that the indication information has two features. One feature is that the remote user equipment can provide the indication information, and the other feature is that the indication information can be used to instruct the base station to determine a relay communication period of the remote user equipment. Information having the foregoing two features can be used as the indication information.

In an example, the indication information may be an identifier of the remote user equipment. The remote user equipment has an identifier of the remote user equipment. In other words, the remote user equipment can provide the identifier of the remote user equipment. In addition, because the communication period of the remote user equipment is configured by the base station, the base station stores period configuration information of the remote user equipment. The period configuration information is in correspondence to the identifier of the remote user equipment, and the period configuration information records the relay communication period of the remote user equipment. Therefore, the base station can determine the relay communication period of the remote user equipment based on the identifier of the remote user equipment and the configuration information that corresponds to the remote user equipment. It can be learned that the identifier of the remote user equipment has the foregoing two features, and therefore can be used as the indication information.

In another example, the indication information may be period configuration information of the remote user equipment, and the period configuration information is used to indicate the relay communication period of the remote user equipment. The remote user equipment needs to execute a communication period of the remote user equipment. Therefore, the remote user equipment stores the period configuration information of the remote user equipment. In other words, the remote user equipment can provide the period configuration information of the remote user equipment. Further, the period configuration information of the remote user equipment records the relay communication period of the remote user equipment. Therefore, the base station can determine the relay communication period of the remote user equipment based on the period configuration information of the remote user equipment. It can be learned that the identifier of the remote user equipment has the foregoing two features, and therefore can be used as the indication information.

202. The relay user equipment sends, to a base station, a resource request carrying the indication information, so that the base station determines a relay communication period of the remote user equipment according to the indication information, and allocates a first initial resource in the relay communication period to the relay user equipment.

During specific implementation, after receiving the request message, the relay user equipment may obtain the indication information carried in the request message, embed the indication message to the resource request corresponding to a response message, and send the resource request corresponding to the response message to the base station, to request the base station to allocate a resource used for sending the response message. After receiving the resource request, the base station may determine the relay communication period of the remote user equipment according to the indication information carried in the resource request, and then may allocate, from a resource in the relay communication period, the resource used by the relay user equipment to send the response message, use the allocated resource as the first initial resource, and send the first initial resource to the relay user equipment.

It may be understood that a manner in which the base station determines the relay communication period is related to the indication information received by the base station. In different implementations, if different indication information is received, the base station may determine relay communication in different manners.

In an example, the indication information received by the base station may be the identifier of the remote user equipment. The base station may search, based on the identifier of the remote user equipment, period configuration information stored in the remote user equipment for the period configuration information corresponding to the identifier of the remote user equipment. The period configuration information is configuration information of the remote user equipment, and records the relay communication period of the remote user equipment. Therefore, the base station may read the period configuration information of the remote user equipment to determine relay communication information of the remote user equipment.

In another example, the indication information received by the base station may be the period configuration information of the remote user equipment. The base station obtains period configuration of the remote user equipment from the resource request corresponding to the response message. Because the period configuration information of the remote user equipment records the relay communication period of the remote user equipment, the base station may read the period configuration information to determine the relay communication period of the remote user equipment.

In this embodiment, the relay communication period may be periods within which the remote user equipment communicates with the relay user equipment in different period configuration manners.

In an example, the base station may configure a communication period for the remote user equipment in a discontinuous reception (English: Discontinuous Reception, DRX for short) configuration manner. The relay communication period is a DRX dormant period, and a base station communication period is a DRX active period. The DRX dormant period and the DRX active period may be configured by the base station for the remote user equipment and delivered to the remote user equipment.

In another example, the base station may configure the relay communication period for the remote user equipment in a gap (English: gap) configuration manner. In other words, the relay communication period is a gap. For example, in a technical scenario of relay discovery, the relay communication period is specifically a discovery gap (English: discovery gap). The remote user equipment may send a gap (English: gap) request to the base station based on a requirement of the remote user equipment, and the base station may configure a gap, requested by the remote user equipment, for communication between the remote user equipment and the relay user equipment.

In this embodiment, the base station may allocate, to the relay user equipment in a plurality of different manners, the resource used for sending the response message.

In an example, the base station may allocate a plurality of resources, so that the relay user equipment selects the resource used for sending the response message. Specifically, the base station may allocate a plurality of resources in the relay communication period to the relay user equipment as first initial resources, and the relay user equipment may select, from the plurality of first initial resources, a first target resource used for sending the response message. The base station may allocate the plurality of first initial resources by allocating a resource pool (English: Resource pool). Specifically, the base station may allocate a resource pool in the relay communication period to the relay user equipment, and the resource pool includes a plurality of resources and each resource in the resource pool is in the relay communication period. It can be learned that the resources included in the resource pool are the first initial resources. The relay user equipment may select one resource from the resource pool to send the response message. In other words, the resource selected by the relay user equipment from the resource pool is the first target resource.

In another example, the base station may allocate one resource, and designate the resource for the relay user equipment for sending the response message. Specifically, the base station may allocate one resource in the relay communication period to a relay communication user as the first initial resource, and the first initial resource is a resource that is designated for the relay user equipment for sending the response message. In other words, the first initial resource is a resource that is designated for the relay user equipment as the first target resource. The first initial resource may be one dedicated resource (English: dedicated resource) in the relay communication period, and the base station may designate one dedicated resource in a resource pool in the relay communication period, so that the relay user equipment sends the response message by using the dedicated resource. In other words, the dedicated resource is the first initial resource, and is also the first target resource. The dedicated resource may be, for example, designated in an SL-grant that is sent by the base station to the relay user equipment.

In step 202, to request the base station to allocate the resource used for sending the response message, the relay user equipment communicates with the base station. Therefore, the relay user equipment needs to be in the RRC connected mode in this case. It may be understood that after step 201, the relay user equipment receives the request message sent by the remote user equipment, and in this case, the relay user equipment may be in an RRC idle mode or the RRC connected mode. If the relay user equipment is in the RRC connected mode after step 201, the relay user equipment may directly perform step 202 without switching the state. If the relay user equipment is in the RRC idle mode after step 201, the relay user equipment may first switch from the RRC idle mode to the RRC connected mode, and then perform step 202.

Figure 3:
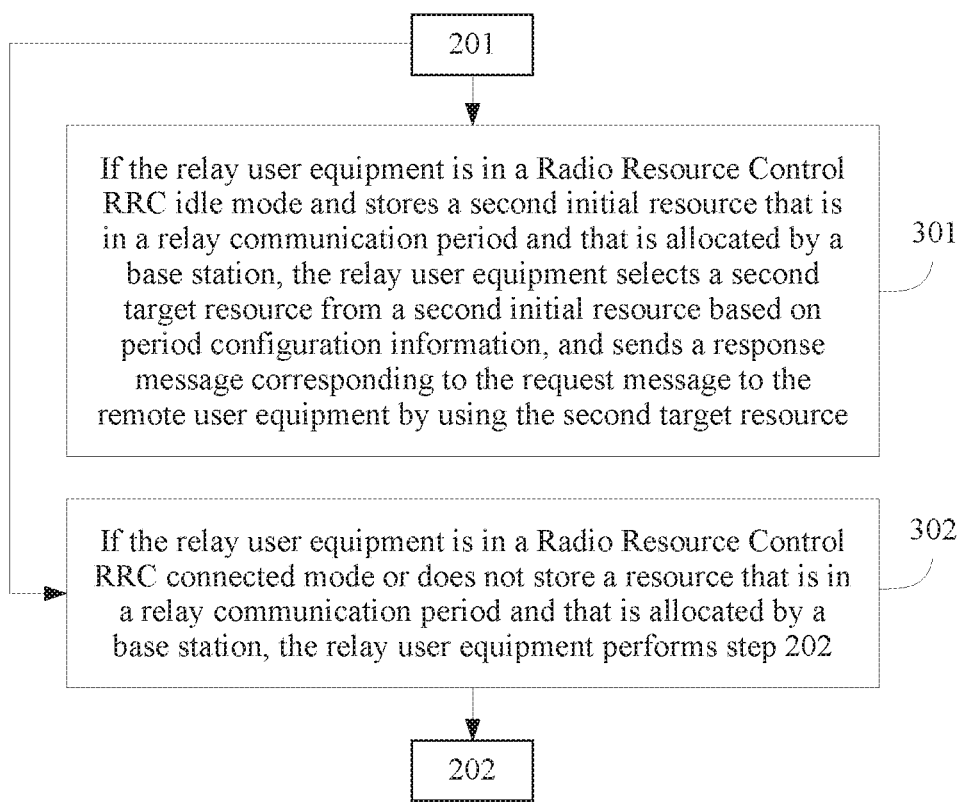
FIG. 3 is a schematic flowchart of a response message transmission method according to an embodiment of the present invention.

It should be noted that sometimes the base station allocates, to the relay user equipment, a resource that can be independently selected by the relay user equipment. Then, when the relay user equipment communicates with the remote user equipment, if the relay user equipment is in the RRC idle mode, the relay user equipment may not request the resource from the base station, but independently select, from the resource that is previously allocated by the base station, a resource used for sending a message to the remote user equipment. In this way, the relay user equipment may not need to switch from the RRC idle mode to the RRC connected mode, thereby avoiding a problem that excessive resources and power are consumed in the RRC connected mode. In this embodiment, specifically, if the indication information is the period configuration information of the remote user equipment, the relay user equipment may receive the request message and read the period configuration information of the remote user equipment from the request message, to determine the relay communication period of the remote user equipment. It can be learned that when the indication message is the period configuration information of the remote user equipment, the relay user equipment can select the resource in the relay communication period of the remote user equipment. Based on this, in some implementations of this embodiment, when the indication message is the period configuration information of the remote user equipment, if the relay user equipment is in the RRC idle mode after receiving the request message, the relay user equipment may first search, in the RRC idle mode, the resource allocated by the base station for the resource in the relay communication period of the remote user equipment, and if the relay user equipment cannot find the resource, the relay user equipment switches to the RRC connected mode to request the base station to allocate the resource. Specifically, referring to FIG. 3, after step 201, this embodiment may further include, for example, the following steps.

301. If the relay user equipment is in a Radio Resource Control RRC idle mode and stores a second initial resource that is in the relay communication period and that is allocated by the base station, the relay user equipment selects a second target resource from the second initial resource based on the period configuration information, and sends a response message corresponding to the request message to the remote user equipment by using the second target resource.

During specific implementation, before the relay user equipment is in the RRC idle mode, the base station allocates, to the relay user equipment, a resource pool from which the relay user equipment can independently select a resource. Then, the relay user equipment receives, in the RRC idle mode, the request message sent by the remote user equipment, and may read the period configuration information of the remote user equipment from the request message, to determine the relay communication period of the remote user equipment. Then, the relay user equipment may search the resource pool that is previously allocated by the base station for a resource in the relay communication period. If the relay user equipment can find the resource, the relay user equipment uses the found resource as the second initial resource, and the relay user equipment may select one resource from the second initial resource as the second target resource, and send, on a time-frequency location represented by the second target resource, the response message corresponding to the request message.

The base station may allocate, to the relay user equipment by broadcasting a system information block (English: System Information Block, SIB for short), the resource that can be independently selected and used by the relay user equipment. The allocated resource may be carried in a SIB 18 or a SIB 19. It can be learned that if the allocated resource includes the second initial resource in the relay communication period of the remote user, the second initial resource is added to the SIB 18 or the SIB 19 and is delivered to the relay user equipment.

It may be understood that in step 301, the second target resource used by the relay user equipment to send the response message is not allocated by the base station at the request of the relay user equipment. Therefore, when the relay communication period of the remote user equipment is the DRX dormant period, before step 301, when receiving the resource request that is sent by the remote user equipment and that is used to request the resource, the base station may use a following time period as a non-scheduling period of the remote user equipment, and does not schedule the remote user equipment in the non-scheduling period of the remote user equipment, so that in the non-scheduling period of the remote user equipment, the DRX dormant period of the remote user equipment does not change as the base station perform scheduling, and the remote user equipment can detect, in the DRX dormant period determined by the relay user equipment, the response message that is returned by the relay user equipment.

302. If the relay user equipment is in a Radio Resource Control RRC connected mode or does not store a resource that is in the relay communication period and that is allocated by the base station, the relay user equipment performs step 202.

It may be understood that in step 302, the relay user equipment performs step 202 only when the relay user equipment is in the RRC connected mode or does not store the resource that is in the relay communication period and that is allocated by the base station. In other words, if the relay user equipment is in the RRC connected mode, the relay user equipment performs step 202 regardless of whether the relay user equipment stores the resource that is in the relay communication period and that is allocated by the base station. If the relay user equipment does not store the resource that is in the relay communication period and that is allocated by the base station, the relay user equipment performs step 202 regardless of whether the relay user equipment is in the RRC connected mode or the RRC idle mode.

It should be noted that in a plurality of cases, the relay user equipment does not store, in the RRC idle mode, the resource that is in the relay communication period and that is allocated by the base station. In one case, before the relay user equipment is in the idle mode, the base station does not allocate, to the relay user equipment, a resource pool from which the relay user equipment can independently select a resource. In another case, although the base station allocates, to the relay user equipment before the relay user equipment is in the idle mode, a resource pool from which the relay user equipment can independently select a resource, none resource in the resource pool is in the relay communication period of the remote user equipment.

During specific implementation, after step 201, the relay user equipment may first determine whether the relay user equipment is in the idle mode. If the relay user equipment is not in the idle mode, the relay user equipment performs step 202. If the relay user equipment is in the idle mode, the relay user equipment searches for a resource pool allocated by the base station. If the relay user equipment cannot find the resource pool, the relay user equipment performs step 302. If the relay user equipment can find the resource pool, the relay user equipment searches the resource pool allocated by the base station for a resource in the relay communication period. If the relay user equipment cannot find the resource, the relay user equipment performs step 302. If the relay user equipment can find the resource, the relay user equipment performs step 301.

Then, return to FIG. 2.

203. The relay user equipment determines a first target resource based on the first initial resource, and sends a response message corresponding to the request message to the remote user equipment by using the first target resource.

During specific implementation, after receiving the first initial resource, the relay user equipment may determine the first target resource from the first initial resource, and send the response message to the remote user equipment on a time-frequency location represented by the first target resource, so that the remote user equipment receives the response message.

It may be understood that for different manners in which the base station allocates the first initial resource, the relay user equipment may determine the first target resource in different manners.

In an example, if the base station may allocate a plurality of first initial resources to the relay user equipment for selection, the relay user equipment may select one first target resource from the plurality of second initial resources, to send the response message. Specifically, for example, the first target resource in step 203 may be determined in the following manner: The relay user equipment selects one resource from the plurality of first initial resources as the first target resource, where the base station allocates, to the relay user equipment, a plurality of first initial resources that can be selected and used by the relay user equipment. For example, the base station may allocate, to the relay user equipment, a resource pool including a plurality of first initial resources, and the relay user equipment may select one resource from the resource pool as the first target resource.

In another example, if the base station allocates one first initial resource, and designates the first initial resource for the relay user equipment, the relay user equipment may directly use the first initial resource as the first target resource, to send the response message. Specifically, for example, the first target resource in step 203 may be determined in the following manner: The relay user equipment determines the first initial resource as the first target resource, where the base station allocates, to the relay user equipment, one first initial resource that is designated for the relay user equipment. For example, the base station may allocate, to the relay user equipment, one dedicated resource in the relay communication period from a resource pool, and the relay user equipment may send the response message by using the dedicated resource. In other words, the dedicated resource is the first initial resource, and is also the first target resource.

It should be noted that this embodiment may relate to exchange of the request message and the response message between the remote user equipment and the relay user equipment in different technical scenarios.

For example, one example technical scenario may be a relay discovery process. The request message is a request message used for relay discovery, namely, a solicitation. The response message is a response message used for relay discovery, namely, a response. The remote user equipment broadcasts the solicitation, to request to access relay user equipment that can receive the solicitation. The relay user equipment that can receive the solicitation returns the response to the remote user equipment, to notify the remote user equipment that the relay user equipment can be accessed. The remote user equipment receives responses of one or more relay user equipments, to select one relay user equipment and initiate access.

For another example, another example technical scenario may be a direct communication link setup process. The request message is a request message used to set up a direct communication link, or may be referred to as a direct communication link setup request. The response message is a response message used to set up a direct communication link, namely, a response. After the remote user equipment sends the direct communication link setup request to the relay user equipment, authentication is performed and security information is established between the relay user equipment and the remote user equipment, and after the authentication succeeds and the security information is established, the relay user equipment sends the response to the remote user equipment.

In this embodiment, when the relay user equipment requests the base station to allocate the resource used for sending the response message, the resource request sent by the relay user equipment may carry the indication information sent by the remote user equipment, and the indication information may be used by the base station to determine the relay communication period of the remote user equipment. In this way, it can be ensured that the base station allocates, from the resource in the relay communication period of the remote user equipment and according to the indication information, the resource used by the relay user equipment to send the response message. It can be learned that the base station can determine the relay communication period of the remote user equipment by using the indication information carried in the resource request of the relay user equipment, and it can be ensured that the resource allocated to the relay user equipment for sending the response message is definitely a resource in the relay communication period of the remote user equipment. Therefore, it can be ensured that the relay user equipment returns, in the relay communication period of the remote user equipment, the response message corresponding to the request message to the remote user equipment, to avoid a case in which the remote user equipment cannot detect the response message, and to reduce a failure probability of a service requested by the remote user equipment.

Figure 4:
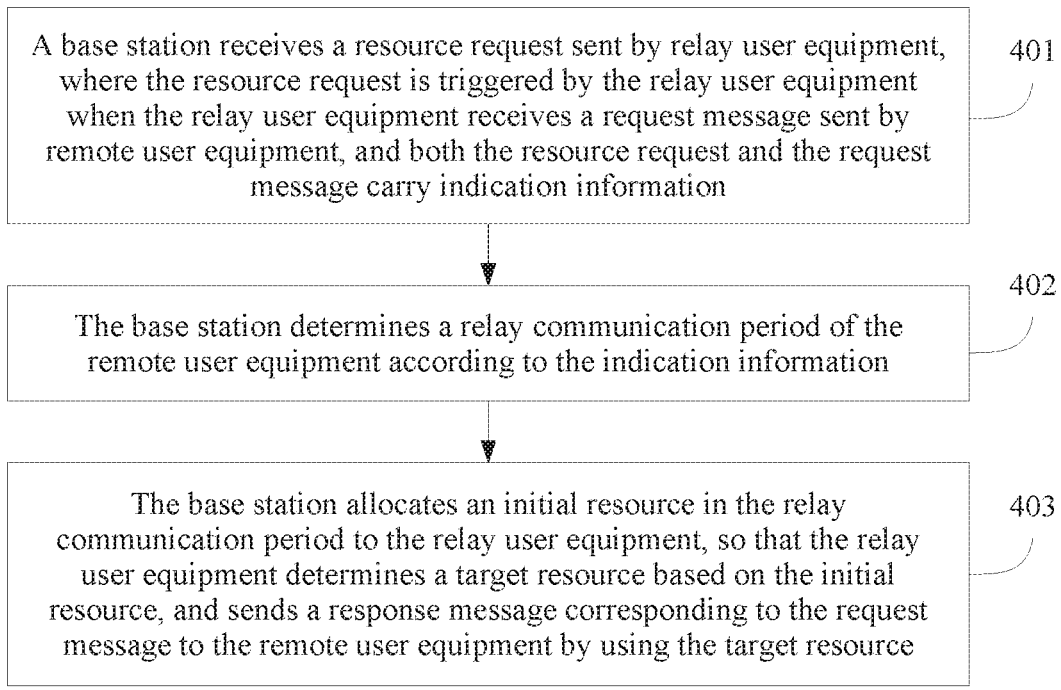
FIG. 4 is a schematic flowchart of a response message transmission method according to an embodiment of the present invention.

FIG. 4 is a schematic flowchart of a response message transmission method according to an embodiment of the present invention. The method in this embodiment is described from the perspective of a base station. A resource request sent by relay user equipment carries indication information sent by remote user equipment, and the indication information is used by the base station to determine a relay communication period of the remote user equipment. Specifically, the method in this embodiment may include, for example, the following steps.

401. The base station receives a resource request sent by the relay user equipment, where the resource request is triggered by the relay user equipment when the relay user equipment receives a request message sent by the remote user equipment, and both the resource request and the request message carry indication information.

402. The base station determines a relay communication period of the remote user equipment according to the indication information.

403. The base station allocates an initial resource in the relay communication period to the relay user equipment, so that the relay user equipment determines a target resource based on the initial resource, and sends a response message corresponding to the request message to the remote user equipment by using the target resource.

Optionally, the indication information may be an identifier of the remote user equipment.

Optionally, the indication information may be period configuration information of the remote user equipment, and the period configuration information is used to indicate the relay communication period of the remote user equipment.

Optionally, the allocating, by the base station, an initial resource in the relay communication period to the relay user equipment may be specifically: allocating, by the base station, a plurality of resources in the relay communication period to the relay user equipment as initial resources.

The relay user equipment selects the target resource from the plurality of initial resources.

Optionally, the allocating, by the base station, an initial resource in the relay communication period to the relay user equipment may be specifically:

allocating, by the base station, one resource in the relay communication period to the relay user equipment as the initial resource.

The initial resource is a resource that is designated for the relay user equipment.

Optionally, the relay communication period may be specifically a discontinuous reception DRX dormant period that is configured by the base station for the remote user equipment, or the relay communication period may be specifically a discovery gap that is configured by the base station at the request of the remote user equipment.

Optionally, the request message may be a request message used for relay discovery, or the request message may be a request message used to set up a direct communication link.

It should be noted that this embodiment corresponds to the embodiment shown in FIG. 2, and a difference between the two embodiments lies in that this embodiment is described from the perspective of the base station and the embodiment shown in FIG. 2 is described from the perspective of the relay user equipment. Therefore, for related content in this embodiment, refer to the descriptions of the embodiment shown in FIG. 2. The "initial resource" in this embodiment corresponds to the "first initial resource" in the embodiment shown in FIG. 2, and the "target resource" in this embodiment corresponds to the "first target resource" in the embodiment shown in FIG. 2.

In this embodiment, the base station can determine the relay communication period of the remote user equipment by using the indication information carried in the resource request of the relay user equipment, and it can be ensured that the resource allocated to the relay user equipment for sending the response message is definitely a resource in the relay communication period of the remote user equipment. Therefore, it can be ensured that the relay user equipment returns, in the relay communication period of the remote user equipment, the response message corresponding to the request message to the remote user equipment, to avoid a case in which the remote user equipment cannot detect the response message, and to reduce a failure probability of a service requested by the remote user equipment.

Figure 5:
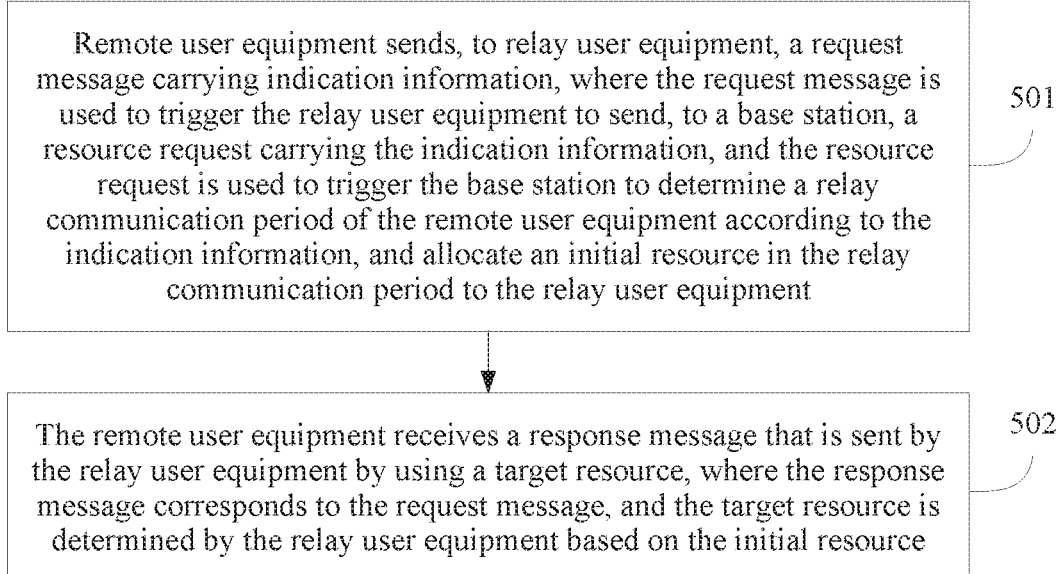
FIG. 5 is a schematic flowchart of a response message transmission method according to an embodiment of the present invention.

FIG. 5 is a schematic flowchart of a response message transmission method according to an embodiment of the present invention. The method in this embodiment is described from the perspective of remote user equipment. A resource request sent by relay user equipment carries indication information sent by the remote user equipment, and the indication information is used by a base station to determine a relay communication period of the remote user equipment. Specifically, the method in this embodiment may include, for example, the following steps.

501. The remote user equipment sends, to the relay user equipment, a request message carrying indication information, where the request message is used to trigger the relay user equipment to send, to the base station, a resource request carrying the indication information, and the resource request is used to trigger the base station to determine a relay communication period of the remote user equipment according to the indication information, and allocate an initial resource in the relay communication period to the relay user equipment.

502. The remote user equipment receives a response message that is sent by the relay user equipment by using a target resource, where the response message corresponds to the request message, and the target resource is determined by the relay user equipment based on the initial resource.

Optionally, the indication information is an identifier of the remote user equipment.

Optionally, the indication information is period configuration information of the remote user equipment, and the period configuration information is used to indicate the relay communication period of the remote user equipment.

Optionally, the relay communication period is specifically a discontinuous reception DRX dormant period that is configured by the base station for the remote user equipment, or the relay communication period is specifically a discovery gap that is configured by the base station at the request of the remote user equipment.

Optionally, the request message is a request message used for relay discovery, or the request message is a request message used to set up a direct communication link.

It should be noted that this embodiment corresponds to the embodiment shown in FIG. 2, and a difference between the two embodiments lies in that this embodiment is described from the perspective of the remote user equipment and the embodiment shown in FIG. 2 is described from the perspective of the relay user equipment. Therefore, for related content in this embodiment, refer to the descriptions of the embodiment shown in FIG. 2. The "initial resource" in this embodiment corresponds to the "first initial resource" in the embodiment shown in FIG. 2, and the "target resource" in this embodiment corresponds to the "first target resource" in the embodiment shown in FIG. 2.

In this embodiment, the base station can determine the relay communication period of the remote user equipment by using the indication information carried in the resource request of the relay user equipment, and it can be ensured that the resource allocated to the relay user equipment for sending the response message is definitely a resource in the relay communication period of the remote user equipment. Therefore, it can be ensured that the relay user equipment returns, in the relay communication period of the remote user equipment, the response message corresponding to the request message to the remote user equipment, to avoid a case in which the remote user equipment cannot detect the response message, and to reduce a failure probability of a service requested by the remote user equipment.

Figure 6:
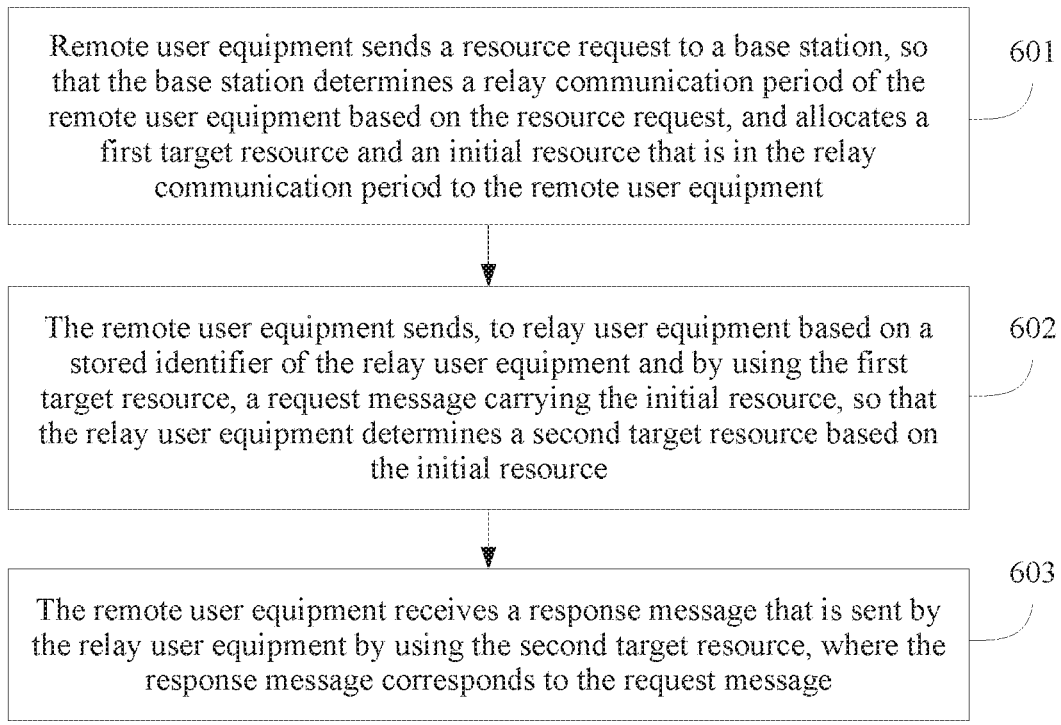
FIG. 6 is a schematic flowchart of a response message transmission method according to an embodiment of the present invention.

FIG. 6 is a schematic flowchart of a response message transmission method according to an embodiment of the present invention. The method in this embodiment is described from the perspective of remote user equipment. When requesting a base station to allocate a resource used for sending a request message, the remote user equipment also requests a resource used for sending a response message, and the base station may allocate, to the remote user equipment based on a resource request of the remote user equipment, the resource used for sending the request message and the resource used for sending the response message. Specifically, the method in this embodiment may include, for example, the following steps.

601. The remote user equipment sends a resource request to the base station, so that the base station determines a relay communication period of the remote user equipment according to the resource request, and allocates a first target resource and an initial resource that is in the relay communication period to the remote user equipment.

During specific implementation, the remote user equipment may send the resource request to the base station, to request the base station to allocate a resource that is used by the remote user equipment to send a request message and a resource that is used by the relay user equipment to send a response message. The base station may recognize the remote user equipment according to the resource request sent by the remote user equipment. In addition, because a communication period of the remote user equipment is configured by the base station, the base station stores period configuration information of the remote user equipment, and the period configuration information records the relay communication period of the remote user equipment. Therefore, the base station can find the period configuration information of the remote user equipment according to the resource request sent by the remote user equipment, and read the period configuration information of the remote user equipment to determine the relay communication period of the remote user equipment. After determining the relay communication period of the remote user equipment, the base station may allocate the first target resource and the initial resource from resources in the relay communication period, and send the first target resource and the initial resource to the remote user equipment. The first target resource is used by the remote user equipment to send the request message, and the relay user equipment determines, from the initial resource, a second target resource used for sending the response message.

It may be understood that to request the base station to allocate the resources, the remote user equipment communicates with the base station. Therefore, the remote user equipment is in a Radio Resource Control (English: Radio Resource Control. RRC for short) connected mode in this case.

602. The remote user equipment sends, to the relay user equipment based on a stored identifier of the relay user equipment and by using the first target resource, a request message carrying the initial resource, so that the relay user equipment determines the second target resource based on the initial resource.

During specific implementation, for relay user equipment to which the remote user equipment previously connects, the remote user equipment stores an identifier of the relay user equipment. For example, the remote user equipment may store a proximity service (English: Proximity Service, ProSe for short) identifier (ID for short in English) of the relay user equipment. After receiving the first target resource and the initial resource, the remote user equipment may select a stored identifier of relay user equipment, and send, on a time-frequency location identified by the first target resource and to the relay user equipment corresponding to the identifier, the request message carrying the initial resource. After receiving the request message, the relay user equipment may obtain the initial resource from the request message, and determine, from the initial resource, one second target resource used for sending the response message.

Optionally, the base station may allocate, to the relay user equipment, a plurality of initial resources that can be selected and used by the relay user equipment, and the relay user equipment may select the second target resource from the plurality of initial resources.

Optionally, the base station may allocate, to the relay user equipment, one initial resource that is designated for the relay user equipment, and the initial resource may be a resource that is designated for the relay user equipment as the second target resource.

603. The remote user equipment receives a response message that is sent by the relay user equipment by using the second target resource, where the response message corresponds to the request message.

During specific implementation, the relay user equipment may send the response message corresponding to the request message to the remote user equipment on a time-frequency location represented by the second target resource.

Optionally, the relay communication period is specifically a discontinuous reception DRX dormant period that is configured by the base station for the remote user equipment.

Optionally, the request message is a request message used for relay discovery, or the request message is a request message used to set up a direct communication link.

It should be noted that a difference between this embodiment and the embodiment shown in FIG. 2 lies in that in this embodiment, the resource used by the relay user equipment to send the response message is allocated by the base station at the request of the remote user equipment before the remote user equipment sends the request message and is sent to the relay user equipment when the request message is sent, and the relay user equipment does not need to request the base station to allocate the resource used for sending the response message; while in the embodiment shown in FIG. 2, the resource used by the relay user equipment to send the response message is allocated by the base station at the request of the relay user equipment after the relay user equipment receives the request message sent by the remote user equipment, and the request message sent by the remote user equipment and the resource request sent by the relay user equipment carry indication information. Other than the foregoing difference, for related content of the remaining part of this embodiment, refer to the descriptions of the embodiment shown in FIG. 2. The "initial resource" in this embodiment corresponds to the "first initial resource" in the embodiment shown in FIG. 2, and the "second target resource" in this embodiment corresponds to the "first target resource" in the embodiment shown in FIG. 2.

In this embodiment, when requesting the base station to allocate the resource used for sending the request message, the remote user equipment also requests the resource used for sending the response message. The base station may allocate, to the remote user equipment according to the resource request of the remote user equipment, the resource used for sending the request message and the resource used for sending the response message, and then the remote user equipment sends, to the relay user equipment, the resource used for sending the response message. Because the resource request sent by the remote user equipment may be used by the base station to determine the relay communication period of the remote user equipment, it can be ensured that the base station allocates, from a resource in the relay communication period of the remote user equipment and according to the resource request sent by the remote user equipment, the resource used for sending the response message. It can be learned that the base station can determine the relay communication period of the remote user equipment by using the resource request of the remote user equipment, and it can be ensured that the resource allocated to the relay user equipment for sending the response message is definitely a resource in the relay communication period of the remote user equipment. Therefore, it can be ensured that the relay user equipment returns, in the relay communication period of the remote user equipment, the response message corresponding to the request message to the remote user equipment, to avoid a case in which the remote user equipment cannot detect the response message, and to reduce a failure probability of a service requested by the remote user equipment.

Figure 7:
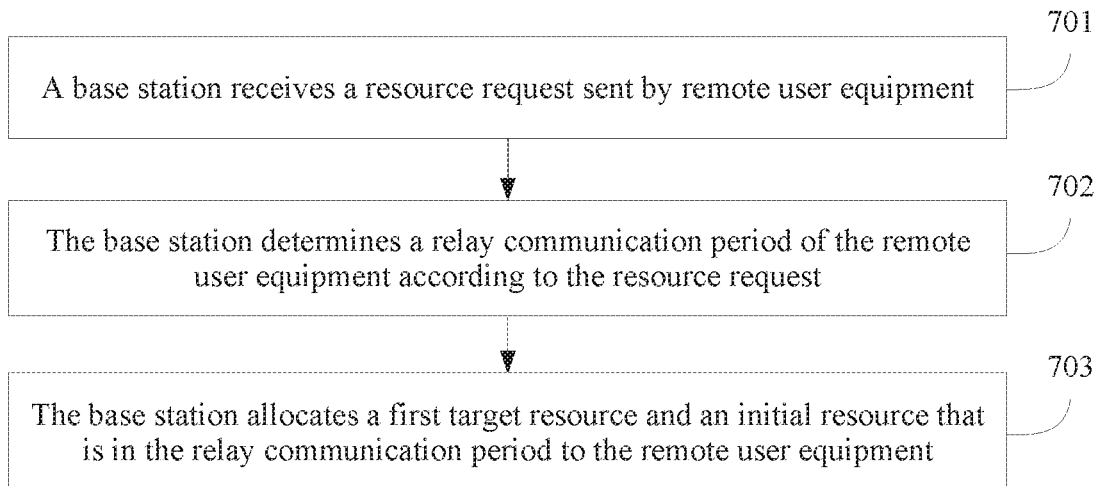
FIG. 7 is a schematic flowchart of a response message transmission method according to an embodiment of the present invention.

FIG. 7 is a schematic flowchart of a response message transmission method according to an embodiment of the present invention. The method in this embodiment is described from the perspective of a base station. When remote user equipment requests the base station to allocate a resource used for sending a request message, the base station may allocate, to the remote user equipment based on a resource request of the remote user equipment, the resource used for sending the request message and a resource used for sending a response message. Specifically, the method in this embodiment may include, for example, the following steps.

701. The base station receives a resource request sent by the remote user equipment.

702. The base station determines a relay communication period of the remote user equipment according to the resource request.

703. The base station allocates a first target resource and an initial resource that is in the relay communication period to the remote user equipment.

The first target resource is used by the remote user equipment to send, to relay user equipment based on a stored identifier of the relay user equipment, a request message carrying the initial resource, the initial resource is used by the relay user equipment to determine a second target resource, and the second target resource is used by the relay user equipment to send a response message corresponding to the request message to the remote user equipment.

Optionally, the allocating, by the base station, a first target resource and an initial resource that is in the relay communication period to the remote user equipment specifically includes:

allocating, by the base station, the first target resource to the remote user equipment; and allocating, by the base station, a plurality of resources in the relay communication period to the remote user equipment as initial resources, where the relay user equipment selects the second target resource from the plurality of initial resources.

Optionally, the allocating, by the base station, a first target resource and an initial resource that is in the relay communication period to the remote user equipment specifically includes:

allocating, by the base station, the first target resource to the remote user equipment; and allocating, by the base station, one resource in the relay communication period to the relay user equipment as the initial resource, where the initial resource is a resource that is designated for the relay user equipment as the second target resource.

Optionally, the relay communication period is specifically a discontinuous reception DRX dormant period that is configured by the base station for the remote user equipment.

Optionally, the request message is a request message used for relay discovery, or the request message is a request message used to set up a direct communication link.

It should be noted that this embodiment corresponds to the embodiment shown in FIG. 6, and a difference between the two embodiments lies in that this embodiment is described from the perspective of the base station and the embodiment shown in FIG. 6 is described from the perspective of the remote user equipment. Therefore, for related content in this embodiment, refer to the descriptions of the embodiment shown in FIG. 6.

In this embodiment, the base station can determine the relay communication period of the remote user equipment by using the resource request of the remote user equipment, and it can be ensured that a resource allocated to the relay user equipment for sending the response message is definitely a resource in the relay communication period of the remote user equipment. Therefore, it can be ensured that the relay user equipment returns, in the relay communication period of the remote user equipment, the response message corresponding to the request message to the remote user equipment, to avoid a case in which the remote user equipment cannot detect the response message, and to reduce a failure probability of a service requested by the remote user equipment.

Figure 8:
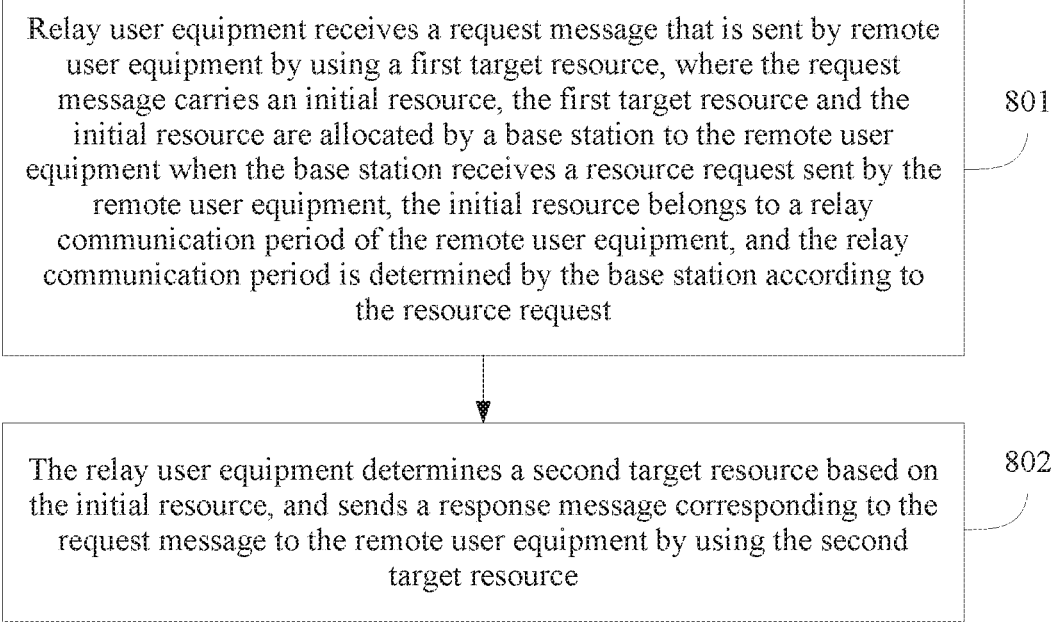
FIG. 8 is a schematic flowchart of a response message transmission method according to an embodiment of the present invention.

FIG. 8 is a schematic flowchart of a response message transmission method according to an embodiment of the present invention. The method in this embodiment is described from the perspective of relay user equipment. When remote user equipment requests a base station to allocate a resource used for sending a request message, the base station may allocate, to the remote user equipment based on a resource request of the remote user equipment, the resource used for sending the request message and a resource used for sending a response message. Specifically, the method in this embodiment may include, for example, the following steps.

801. The relay user equipment receives a request message that is sent by the remote user equipment by using a first target resource, where the request message carries an initial resource, the first target resource and the initial resource are allocated by the base station to the remote user equipment when the base station receives a resource request sent by the remote user equipment, the initial resource belongs to a relay communication period of the remote user equipment, and the relay communication period is determined by the base station according to the resource request.

802. The relay user equipment determines a second target resource based on the initial resource, and sends a response message corresponding to the request message to the remote user equipment by using the second target resource.

Optionally, the determining, by the relay user equipment, a second target resource based on the initial resource is specifically: selecting, by the relay user equipment one resource from a plurality of initial resources as the second target resource, where the base station allocates, to the remote user equipment, a plurality of initial resources that can be selected and used by the relay user equipment.

Optionally, the determining, by the relay user equipment, a second target resource based on the initial resource is specifically: determining, by the relay user equipment, the initial resource as the second target resource, where the base station allocates, to the relay user equipment, one initial resource that is designated for the relay user equipment.

Optionally, the relay communication period is specifically a discontinuous reception DRX dormant period that is configured by the base station for the remote user equipment.

Optionally, the request message is a request message used for relay discovery, or the request message is a request message used to set up a direct communication link.

It should be noted that this embodiment corresponds to the embodiment shown in FIG. 6, and a difference between the two embodiments lies in that this embodiment is described from the perspective of the relay user equipment and the embodiment shown in FIG. 6 is described from the perspective of the remote user equipment. Therefore, for related content in this embodiment, refer to the descriptions of the embodiment shown in FIG. 6.

In this embodiment, the base station can determine the relay communication period of the remote user equipment by using the resource request of the remote user equipment, and it can be ensured that the resource allocated to the relay user equipment for sending the response message is definitely a resource in the relay communication period of the remote user equipment. Therefore, it can be ensured that the relay user equipment returns, in the relay communication period of the remote user equipment, the response message corresponding to the request message to the remote user equipment, to avoid a case in which the remote user equipment cannot detect the response message, and to reduce a failure probability of a service requested by the remote user equipment.

To make a person skilled in the art more easily understand an implementation of the embodiments of the present invention in an actual scenario, the following provides descriptions by using several specific example scenarios.

Figure 9:
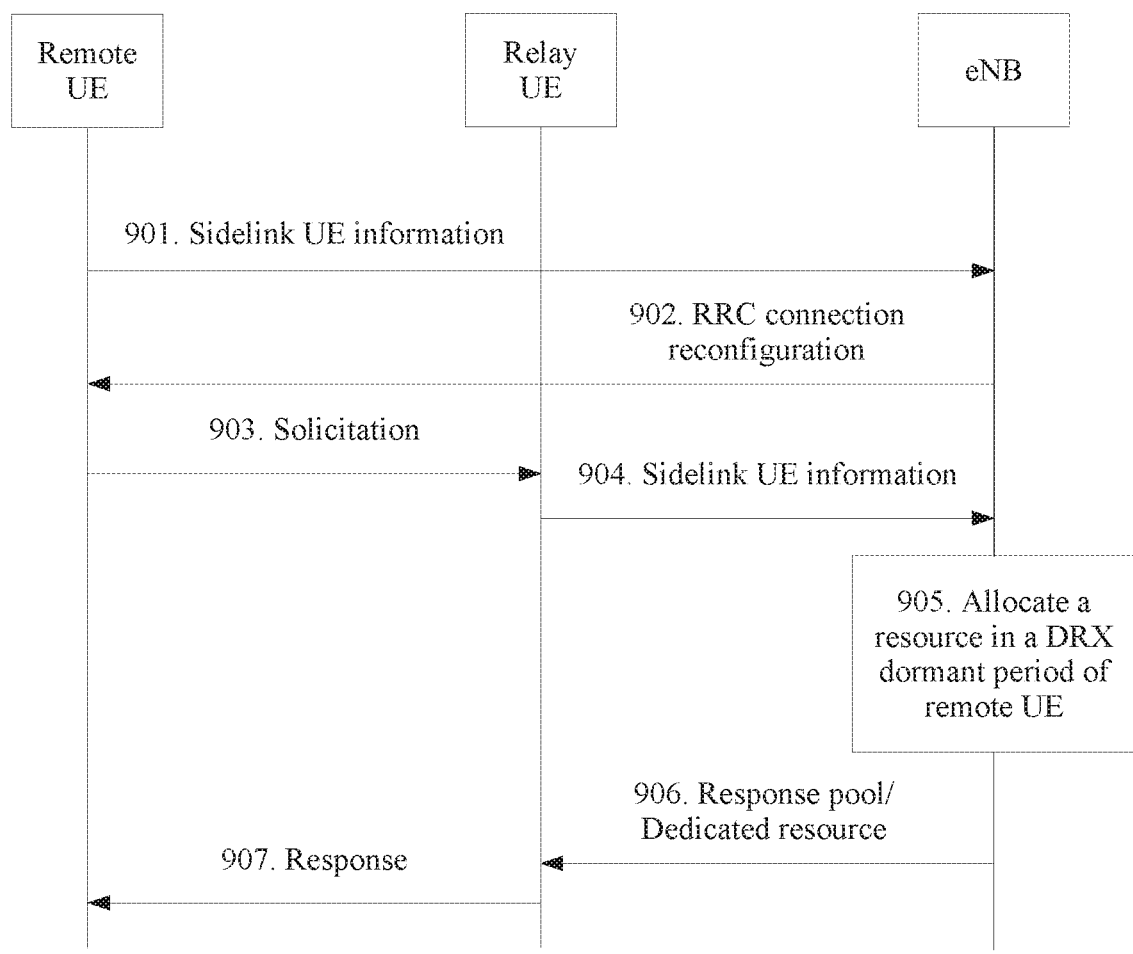
FIG. 9 is a schematic flowchart of a response message transmission method in an example scenario according to an embodiment of the present invention.

FIG. 9 is a schematic flowchart of a response message transmission method in an example scenario according to an embodiment of the present invention. This embodiment corresponds to the embodiments shown in FIG. 2 to FIG. 5, the example scenario corresponds to a relay discovery process, indication information is an identifier of remote user equipment, and a relay communication period is a DRX dormant period. This embodiment may specifically include, for example, the following steps.

901. Remote UE sends sidelink UE information to an eNB.

The sidelink UE information specifically carries a resource request corresponding to a solicitation, the remote UE represents remote user equipment, and the eNB represents a base station.

902. The eNB sends RRC connection reconfiguration to the remote UE.

The RRC connection reconfiguration specifically carries a resource used for sending the solicitation.

903. The remote UE sends, to relay UE, a solicitation carrying a UE ID.

Specifically, the remote UE sends the solicitation by using the resource allocated by the eNB. The solicitation may be specifically broadcast.

The relay UE represents relay user equipment, the UE II) represents an identifier of the remote user equipment, and the solicitation represents a request message used for relay discovery.

904. The relay UE sends, to the eNB, sidelink UE information carrying the UE ID.

The sidelink UE information specifically carries a resource request corresponding to a response, and the resource request corresponding to the response carries the UE ID.

It may be understood that after step 903, if the relay user equipment is an RRC idle mode, the relay user equipment switches to an RRC connected mode, and then performs step 904.

905. The eNB allocates, in a DRX dormant period of the remote UE, a resource used for sending a response.

Specifically, the eNB finds DRX configuration information of the remote UE based on the UE ID, and reads the DRX configuration information to determine the DRX dormant period of the remote UE, so that the resource is allocated in the DRX dormant period of the remote UE. The eNB may allocate a resource pool, or may allocate a dedicated resource.

906. The eNB sends an allocated resource pool or dedicated resource to the relay UE.

The resource pool represents a resource pool, and the dedicated resource represents a dedicated resource.

907. The relay UE sends the response to the remote UE.

Specifically, the relay UE sends the response by using the resource allocated by the eNB. If the eNB allocates the response pool, the relay UE selects one resource from the response pool to send the response message. If the eNB allocates the dedicated resource, the relay UE sends the response message by using the dedicated resource.

Figure 10:
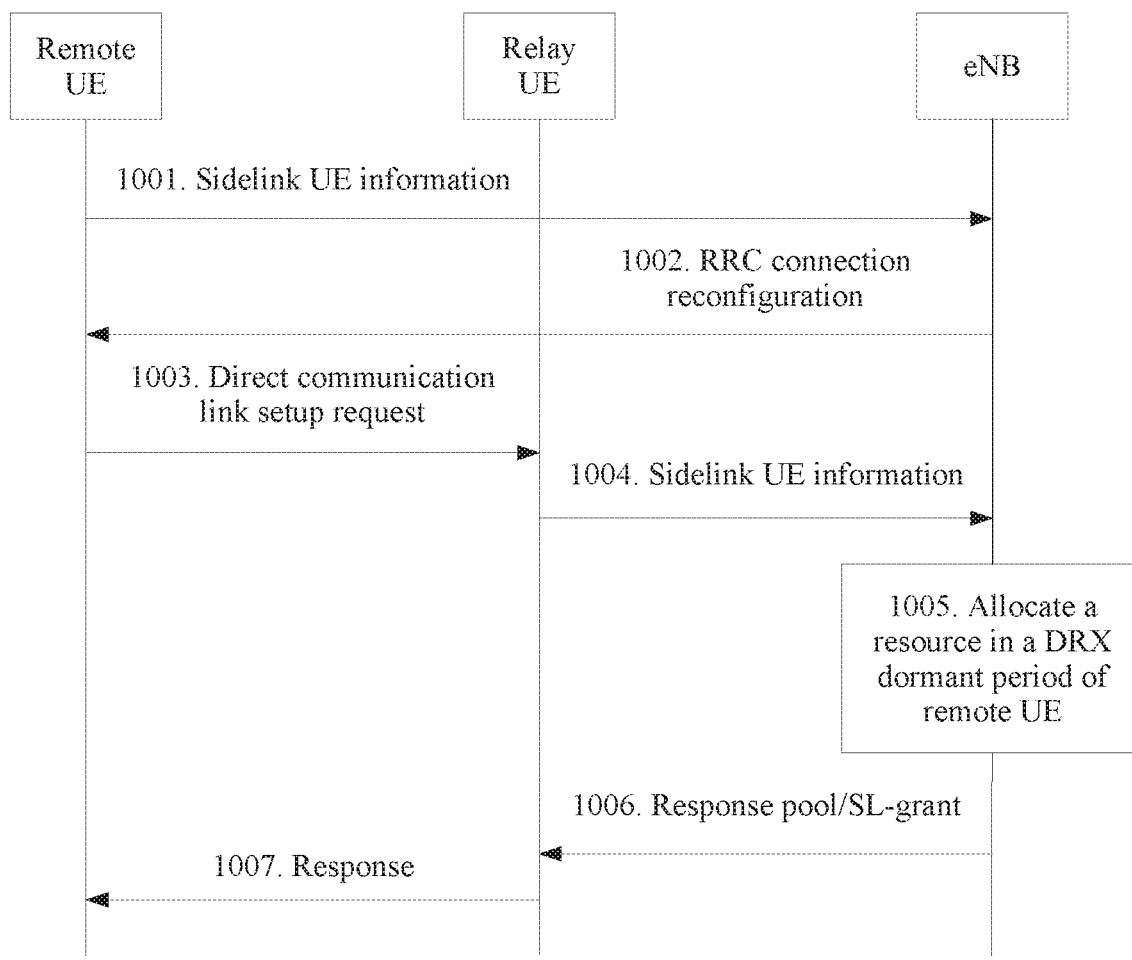
FIG. 10 is a schematic flowchart of a response message transmission method in another example scenario according to an embodiment of the present invention.

FIG. 10 is a schematic flowchart of a response message transmission method in another example scenario according to an embodiment of the present invention. This embodiment corresponds to the embodiments shown in FIG. 2 to FIG. 5, the example scenario corresponds to a direct communication link setup process, indication information is an identifier of remote user equipment, and a relay communication period is a DRX dormant period. This embodiment may specifically include, for example, the following steps.

1001. Remote UE sends sidelink UE information to an eNB.

The sidelink UE information specifically carries a resource request corresponding to a direct communication link setup request, the remote UE represents remote user equipment, and the eNB represents a base station.

1002. The eNB sends RRC connection reconfiguration to the remote UE.

The RRC connection reconfiguration specifically carries a resource used for sending the direct communication link setup request.

1003. The remote UE sends, to relay UE, a direct communication link setup request carrying a UE ID.

Specifically, the remote UE sends the direct communication link setup request by using the resource allocated by the eNB.

The relay UE represents relay user equipment, and the UE ID represents an identifier of the remote user equipment.

1004. The relay UE sends, to the eNB, sidelink UE information carrying the UE ID.

The sidelink UE information specifically carries a resource request corresponding to a response, and the resource request corresponding to the response carries the UE ID.

It may be understood that after step 1003, if the relay user equipment is an RRC idle mode, the relay user equipment switches to an RRC connected mode, and then performs step 1004.

1005. The eNB allocates, in a DRX dormant period of the remote UE, a resource used for sending a response.

Specifically, the eNB finds DRX configuration information of the remote UE based on the UE ID, and reads the DRX configuration information to determine the DRX dormant period of the remote UE, so that the resource is allocated in the DRX dormant period of the remote UE. The eNB may allocate a resource pool, or may allocate a dedicated resource.

1006. The eNB sends an allocated resource pool or SL-grant to the relay UE.

The resource pool represents a resource pool, and a dedicated resource is designated in the SL-grant.

1007. The relay UE sends the response to the remote UE.

Specifically, the relay UE sends the response by using the resource allocated by the eNB. If the eNB allocates the response pool, the relay UE selects one resource from the response pool to send the response message. If the eNB delivers the SL-grant, the relay UE sends the response message by using the dedicated resource designated in the SL-grant.

Figure 11:
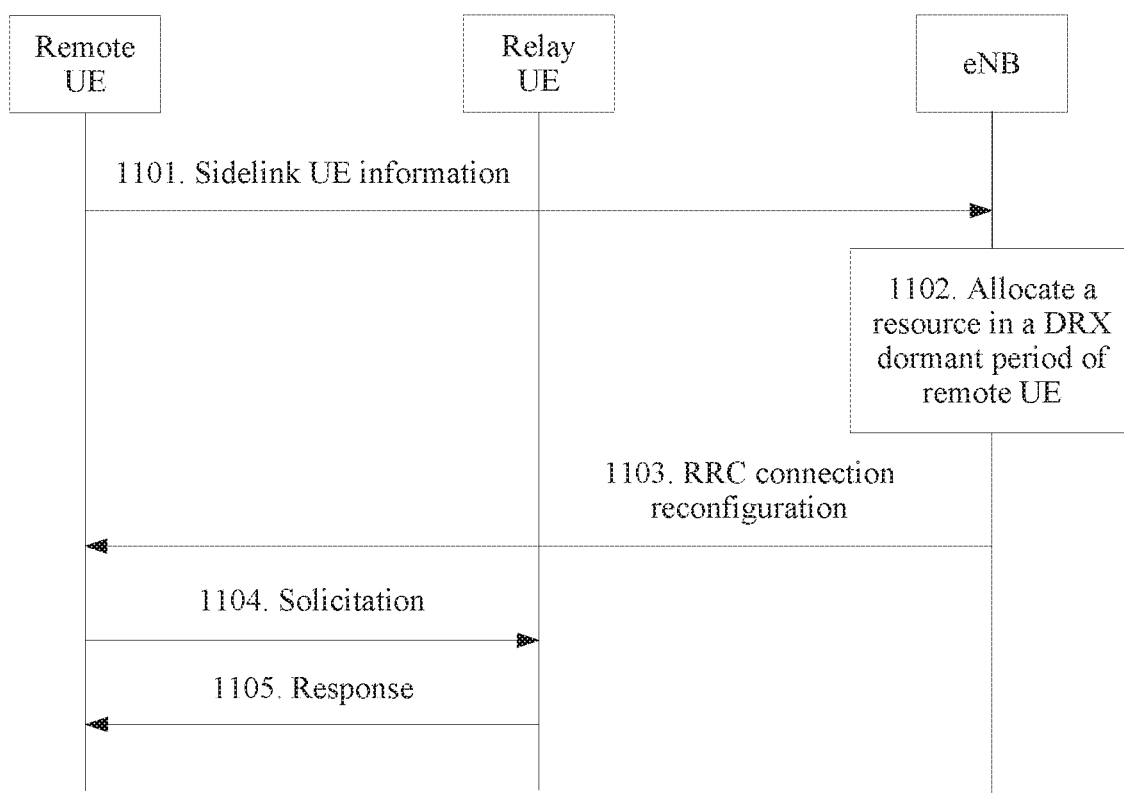
FIG. 11 is a schematic flowchart of a response message transmission method in another example scenario according to an embodiment of the present invention.

FIG. 11 is a schematic flowchart of a response message transmission method in another example scenario according to an embodiment of the present invention. This embodiment corresponds to the embodiments shown in FIG. 6 to FIG. 8, the example scenario corresponds to a relay discovery process, and a relay communication period is a DRX dormant period. This embodiment may specifically include, for example, the following steps.

1101. Remote UE sends sidelink UE information to an eNB.

The sidelink UE information specifically carries a resource request corresponding to a solicitation and a response, the remote UE represents remote user equipment, and the eNB represents a base station.

1102. The eNB allocates, in a DRX dormant period of the remote UE, a resource used for sending a solicitation and a resource used for sending a response.

Specifically, the eNB finds DRX configuration information of the remote UE based on a remote LIE ID carried in the sidelink UE information, and reads the DRX configuration information to determine the DRX dormant period of the remote UE, so that the resources are allocated in the DRX dormant period of the remote UE.

1103. The eNB sends RRC connection reconfiguration to the remote UE.

The RRC connection reconfiguration specifically carries the resource used for sending the solicitation and the resource used for sending the response.

1104. The remote UE sends, to the relay UE, the solicitation carrying the resource used for sending the response message.

Specifically, the remote UE sends the solicitation by using the resource that is allocated by the eNB and that is used for sending the solicitation. The solicitation may be specifically broadcast.

The relay LIE represents relay user equipment, the UE ID represents an identifier of the remote user equipment, and the solicitation represents a request message used for relay discovery.

1105. The relay UE sends the response to the remote UE.

Specifically, the relay UE sends the response by using the resource carried in the solicitation.

Figure 12:
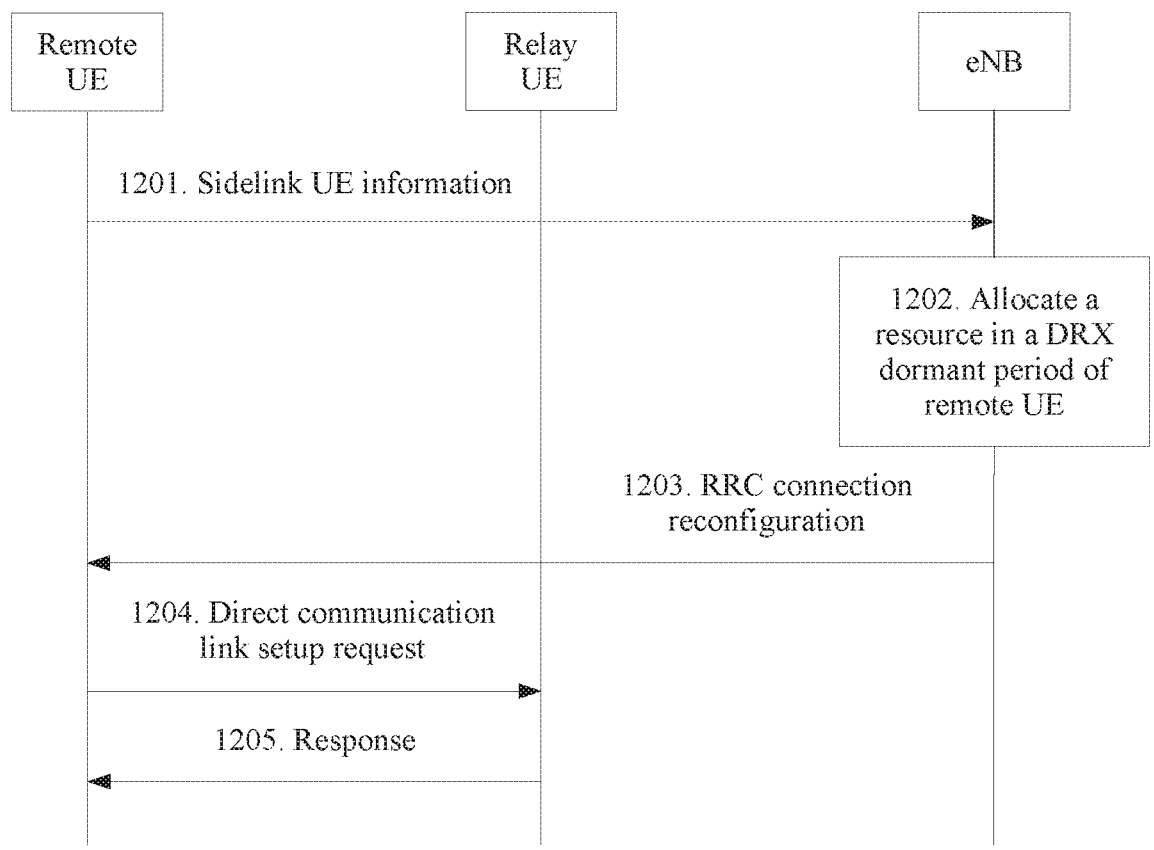
FIG. 12 is a schematic flowchart of a response message transmission method in another example scenario according to an embodiment of the present invention.

FIG. 12 is a schematic flowchart of a response message transmission method in another example scenario according to an embodiment of the present invention. This embodiment corresponds to the embodiments shown in FIG. 6 to FIG. 8, the example scenario corresponds to a direct communication link setup process, and a relay communication period is a DRX dormant period. This embodiment may specifically include, for example, the following steps.

1201. Remote UE sends sidelink UE information to an eNB.

The sidelink UE information specifically carries a resource request corresponding to a direct communication link setup request and a response, the remote UE represents remote user equipment, and the eNB represents a base station.

1202. The eNB allocates, in a DRX dormant period of the remote UE, a resource used for sending a direct communication link setup request and a resource used for sending a response.

Specifically, the eNB finds DRX configuration information of the remote UE based on a remote UE ID carried in the sidelink UE information, and reads the DRX configuration information to determine the DRX dormant period of the remote UE, so that the resources are allocated in the DRX dormant period of the remote UE.

1203. The eNB sends RRC connection reconfiguration to the remote UE.

The RRC connection reconfiguration specifically carries the resource used for sending the direct communication link setup request and the resource used for sending the response.

1204. The remote UE sends, to relay UE, the direct communication link setup request carrying the resource used for sending the response.

Specifically, the remote UE sends the direct communication link setup request by using the resource that is allocated by the eNB and that is used for sending the direct communication link setup request.

The relay UE represents relay user equipment, and the UE ID represents an identifier of the remote user equipment.

1205. The relay UE sends the response to the remote UE.

Specifically, the relay UE sends the response by using the resource carried in the direct communication link setup request.

Figure 13:
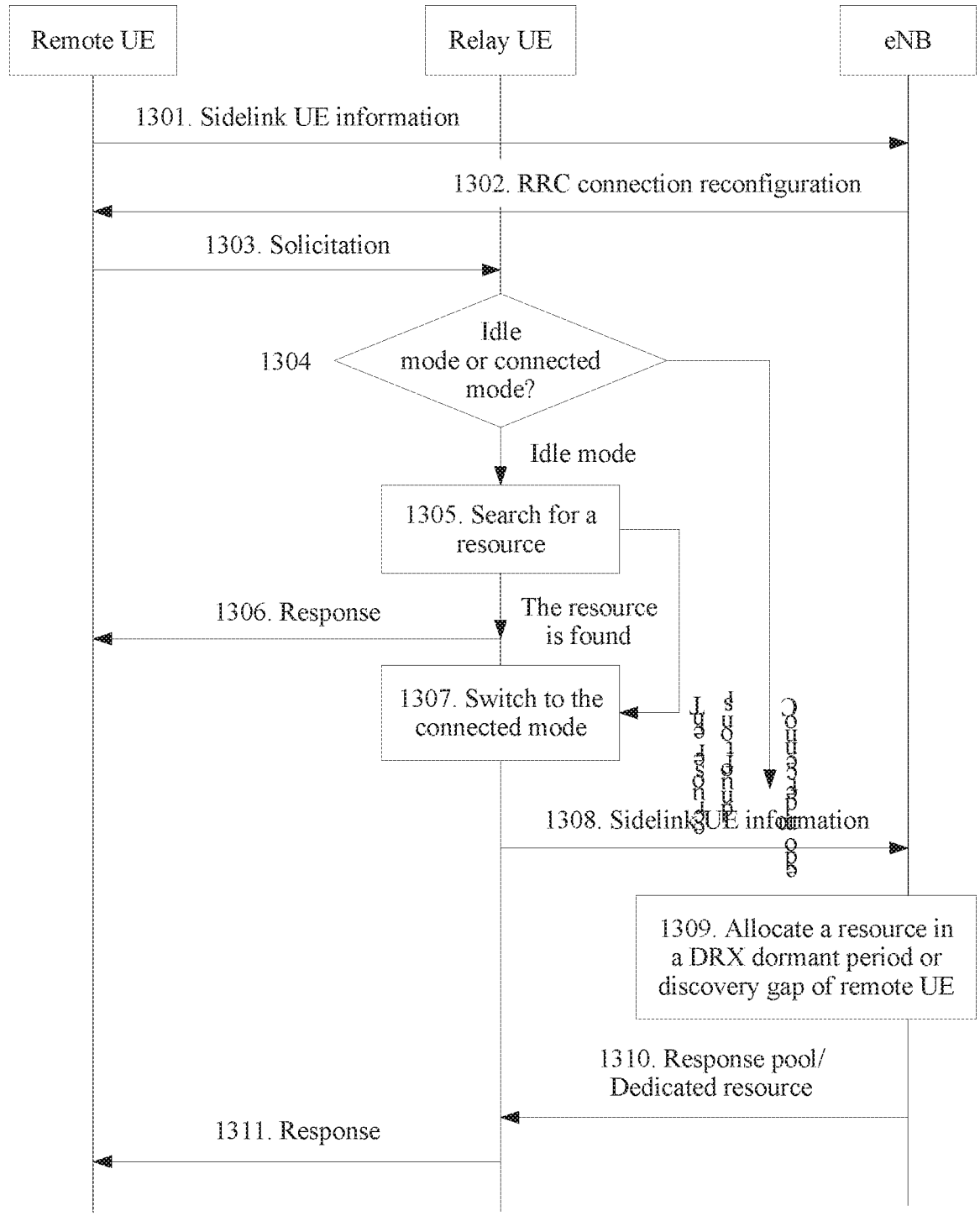
FIG. 13 is a schematic flowchart of a response message transmission method in another example scenario according to an embodiment of the present invention.

FIG. 13 is a schematic flowchart of a response message transmission method in another example scenario according to an embodiment of the present invention. This embodiment corresponds to the embodiments shown in FIG. 2 to FIG. 5, the example scenario corresponds to a relay discovery process, a relay communication period is a DRX dormant period or a discovery gap, and indication information is DRX configuration information or gap configuration information of remote user equipment. This embodiment may specifically include, for example, the following steps.

1301. Remote UE sends sidelink UE information to an eNB.

The sidelink UE information specifically carries a resource request corresponding to a solicitation, the remote UE represents remote user equipment, and the eNB represents a base station.

1302. The eNB sends RRC connection reconfiguration to the remote UE.

The RRC connection reconfiguration specifically carries a resource used for sending the solicitation.

1303. The remote UE sends, to relay UE, a solicitation carrying DRX configuration information or gap configuration information.

Specifically, the remote UE sends the solicitation by using the resource allocated by the eNB. The solicitation may be specifically broadcast. It may be understood that the gap configuration information specifically records a discovery gap that the remote UE pre-requests the base station to allocate.

The relay UE represents relay user equipment, and the solicitation represents a request message used for relay discovery.

1304. The relay UE determines whether the relay UE is in an RRC idle mode or an RRC connected mode.

Specifically, if a determining result is the RRC idle mode, step 1305 is performed, or if a determining result is the RRC connected mode, step 1308 is performed.

1305. The relay UE searches a resource pool previously allocated by the base station for a resource that is in a DRX dormant period or discovery gap of the remote UE.

Specifically, the relay UE may read the DRX configuration information or gap configuration information carried in the solicitation, to determine the DRX dormant period or discovery gap of the relay UE, so that the resource pool previously allocated by the base station is searched for the resource that is in the DRX dormant period or discovery gap of the remote UE. The resource pool previously allocated by the base station may be specifically delivered by the base station to the relay UE by broadcasting a SIB 19, so that the relay UE independently selects and uses a resource.

It may be understood that if the resource can be found in step 1305, step 1306 is performed, or if the resource cannot be found in step 1305, step 1307 is performed.

1306. The relay UE sends a response to the remote UE, by using the found resource.

Specifically, the relay UE may select one resource from the found resource, and send the response to the remote UE by using the selected resource.

1307. The relay UE switches from the RRC idle mode to the RRC connected mode.

1308. The relay UE sends, to the eNB, sidelink UE information carrying the DRX configuration information or gap configuration information.

The sidelink UE information specifically carries a resource request corresponding to a response, and the resource request corresponding to the response carries the DRX configuration information or gap configuration information.

1309. The eNB allocates, in the DRX dormant period or discovery gap of the remote UE, a resource used for sending a response.

Specifically, the eNB reads the DRX configuration information or gap configuration information carried in the sidelink UE information, to determine the DRX dormant period or discovery gap of the remote UE, so that the resource is allocated in the DRX dormant period or discovery gap of the remote UE. The eNB may allocate a resource pool, or may allocate a dedicated resource.

1310. The eNB sends an allocated resource pool or dedicated resource to the relay UE.

The resource pool represents a resource pool, and the dedicated resource represents a dedicated resource.

1311. The relay UE sends the response to the remote UE.

Specifically, the relay UE sends the response by using the resource allocated by the eNB. If the eNB allocates the response pool, the relay UE selects one resource from the response pool to send the response message. If the eNB allocates the dedicated resource, the relay UE sends the response message by using the dedicated resource.

After the implementations of the method in the embodiments of the present invention are described, implementations of the apparatus in the embodiments of the present invention are described below.

Figure 14:
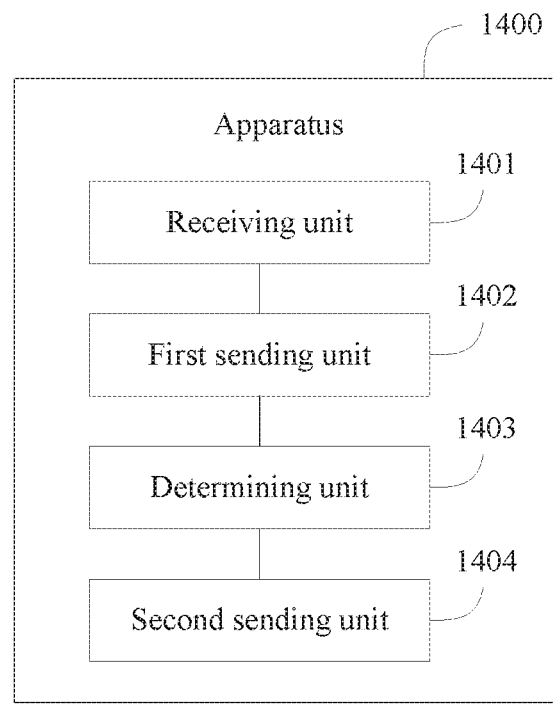
FIG. 14 is a schematic structural diagram of a response message transmission apparatus according to an embodiment of the present invention.

FIG. 14 is a schematic structural diagram of a response message transmission apparatus according to an embodiment of the present invention. An apparatus 1400 in this embodiment may be configured on relay user equipment, and implemented on the relay user equipment. In this embodiment, the apparatus 1400 may specifically include, for example:

a receiving unit 1401, configured to receive a request message sent by remote user equipment, where the request message carries indication information;

a first sending unit 1402, configured to send, to a base station, a resource request carrying the indication information, so that the base station determines a relay communication period of the remote user equipment according to the indication information, and allocates a first initial resource in the relay communication period to the relay user equipment;

a determining unit 1403, configured to determine a first target resource based on the first initial resource; and a second sending unit 1404 configured to send a response message corresponding to the request message to the remote user equipment by using the first target resource.

Optionally, the indication information is an identifier of the remote user equipment.

Optionally, the indication information is period configuration information of the remote user equipment, and the period configuration information is used to indicate the relay communication period of the remote user equipment.

Optionally, the apparatus 1400 further includes:

a third sending unit, configured to: after the receiving unit 1401 receives the request message, if the relay user equipment is in a Radio Resource Control RRC idle mode and stores a second initial resource that is in the relay communication period and that is allocated by the base station, select, by the relay user equipment, a second target resource from the second initial resource based on the period configuration information, and send the response message corresponding to the request message to the remote user equipment by using the second target resource; and a triggering unit, configured to: after the receiving unit 1401 receives the request message, if the relay user equipment is in a Radio Resource Control RRC connected mode or does not store a resource that is in the relay communication period and that is allocated by the base station, trigger the first sending unit 1402 to send the resource request.

Optionally, the determining unit 1403 is specifically configured to select one resource from a plurality of first initial resources as the first target resource, where the base station allocates, to the relay user equipment, a plurality of first initial resources that can be selected and used by the relay user equipment.

Optionally, the determining unit 1403 is specifically configured to determine the first initial resource as the first target resource, where the base station allocates, to the relay user equipment, one first initial resource that is designated for the relay user equipment.

Optionally, the relay communication period is specifically a discontinuous reception DRX dormant period that is configured by the base station for the remote user equipment, or the relay communication period is specifically a discovery gap that is configured by the base station at the request of the remote user equipment.

Optionally, the request message is a request message used for relay discovery, or the request message is a request message used to set up a direct communication link.

In this embodiment, the base station can determine the relay communication period of the remote user equipment by using the indication information carried in the resource request of the relay user equipment, and it can be ensured that the resource allocated to the relay user equipment for sending the response message is definitely a resource in the relay communication period of the remote user equipment. Therefore, it can be ensured that the relay user equipment returns, in the relay communication period of the remote user equipment, the response message corresponding to the request message to the remote user equipment, to avoid a case in which the remote user equipment cannot detect the response message, and to reduce a failure probability of a service requested by the remote user equipment.

Figure 15:
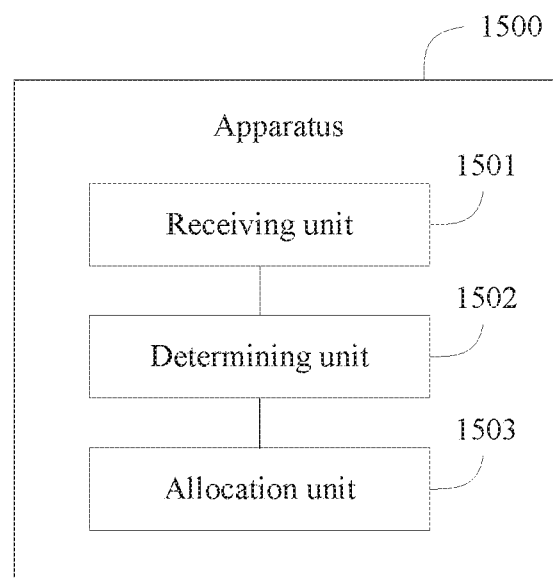
FIG. 15 is a schematic structural diagram of a response message transmission apparatus according to an embodiment of the present invention.

FIG. 15 is a schematic structural diagram of a response message transmission apparatus according to an embodiment of the present invention. An apparatus 1500 in this embodiment may be configured on a base station, and is implemented on the base station. In this embodiment, the apparatus 1500 may specifically include, for example:

a receiving unit 1501, configured to receive a resource request sent by relay user equipment, where the resource request is triggered by the relay user equipment when the relay user equipment receives a request message sent by remote user equipment, and both the resource request and the request message carry indication information;

a determining unit 1502, configured to determine a relay communication period of the remote user equipment according to the indication information; and an allocation unit 1503, configured to allocate an initial resource in the relay communication period to the relay user equipment, so that the relay user equipment determines a target resource based on the initial resource, and sends a response message corresponding to the request message to the remote user equipment by using the target resource.

Optionally, the indication information is an identifier of the remote user equipment.

Optionally, the indication information is period configuration information of the remote user equipment, and the period configuration information is used to indicate the relay communication period of the remote user equipment.

Optionally, the allocation unit 1503 is specifically configured to allocate a plurality of resources in the relay communication period to the relay user equipment as initial resources, where the relay user equipment selects the target resource from the plurality of initial resources.

Optionally, the allocation unit 1503 is specifically configured to allocate, by the base station, one resource in the relay communication period to the relay user equipment as the initial resource, where the initial resource is a resource that is designated for the relay user equipment.

Optionally, the relay communication period is specifically a discontinuous reception DRX dormant period that is configured by the base station for the remote user equipment, or the relay communication period is specifically a discovery gap that is configured by the base station at the request of the remote user equipment.

Optionally, the request message is a request message used for relay discovery, or the request message is a request message used to set up a direct communication link.

In this embodiment, the base station can determine the relay communication period of the remote user equipment by using the indication information carried in the resource request of the relay user equipment, and it can be ensured that the resource allocated to the relay user equipment for sending the response message is definitely a resource in the relay communication period of the remote user equipment. Therefore, it can be ensured that the relay user equipment returns, in the relay communication period of the remote user equipment, the response message corresponding to the request message to the remote user equipment, to avoid a case in which the remote user equipment cannot detect the response message, and to reduce a failure probability of a service requested by the remote user equipment.

Figure 16:
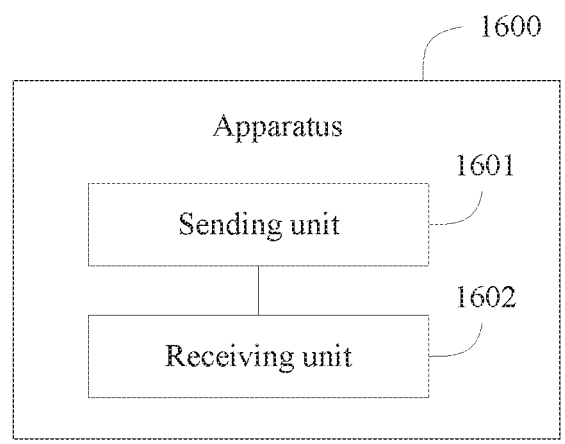
FIG. 16 is a schematic structural diagram of a response message transmission apparatus according to an embodiment of the present invention.

FIG. 16 is a schematic structural diagram of a response message transmission apparatus according to an embodiment of the present invention. An apparatus 1600 in this embodiment may be configured on remote user equipment, and implemented on the remote user equipment. In this embodiment, the apparatus 1600 may specifically include, for example:

a sending unit 1601, configured to send, to relay user equipment, a request message carrying indication information, where the request message is used to trigger the relay user equipment to send, to a base station, a resource request carrying the indication information, and the resource request is used to trigger the base station to determine a relay communication period of the remote user equipment according to the indication information, and allocate an initial resource in the relay communication period to the relay user equipment; and a receiving unit 1602, configured to receive a response message that is sent by the relay user equipment by using a target resource, where the response message corresponds to the request message, and the target resource is determined by the relay user equipment based on the initial resource.

Optionally, the indication information is an identifier of the remote user equipment.

Optionally, the indication information is period configuration information of the remote user equipment, and the period configuration information is used to indicate the relay communication period of the remote user equipment.

Optionally, the relay communication period is specifically a discontinuous reception DRX dormant period that is configured by the base station for the remote user equipment, or the relay communication period is specifically a discovery gap that is configured by the base station at the request of the remote user equipment.

Optionally, the request message is a request message used for relay discovery, or the request message is a request message used to set up a direct communication link.

In this embodiment, the base station can determine the relay communication period of the remote user equipment by using the indication information carried in the resource request of the relay user equipment, and it can be ensured that the resource allocated to the relay user equipment for sending the response message is definitely a resource in the relay communication period of the remote user equipment. Therefore, it can be ensured that the relay user equipment returns, in the relay communication period of the remote user equipment, the response message corresponding to the request message to the remote user equipment, to avoid a case in which the remote user equipment cannot detect the response message, and to reduce a failure probability of a service requested by the remote user equipment.

Figure 17:
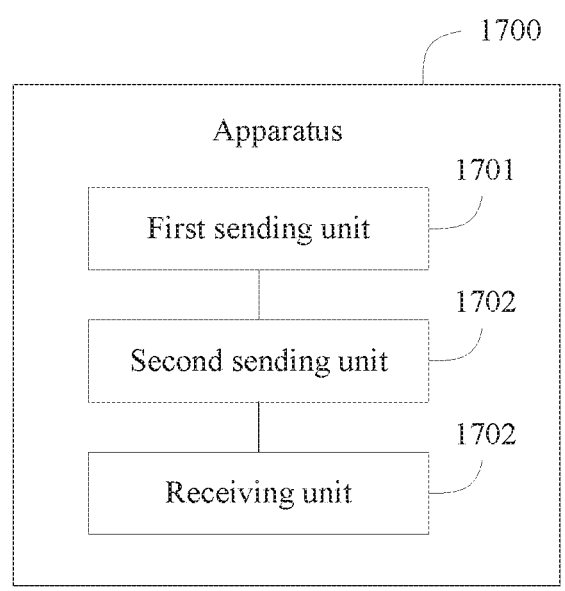
FIG. 17 is a schematic structural diagram of a response message transmission apparatus according to an embodiment of the present invention.

FIG. 17 is a schematic structural diagram of a response message transmission apparatus according to an embodiment of the present invention. The apparatus in this embodiment may be configured on remote user equipment, and implemented on the remote user equipment. In this embodiment, the apparatus may specifically include, for example:

a first sending unit 1701, configured to send a resource request to a base station, so that the base station determines a relay communication period of the remote user equipment according to the resource request, and allocates a first target resource and an initial resource that is in the relay communication period to the remote user equipment;

a second sending unit 1702, configured to send, to relay user equipment based on a stored identifier of the relay user equipment and by using the first target resource, a request message carrying the initial resource, so that the relay user equipment determines the second target resource based on the initial resource; and a receiving unit 1703, configured to receive a response message that is sent by the relay user equipment by using the second target resource, where the response message corresponds to the request message.

Optionally, the base station allocates, to the relay user equipment, a plurality of initial resources that can be selected and used by the relay user equipment, and the relay user equipment selects the second target resource from the plurality of initial resources.

Optionally, the base station allocates, to the relay user equipment, one initial resource that is designated for the relay user equipment, and the initial resource is a resource that is designated for the relay user equipment as the second target resource.

Optionally, the relay communication period is specifically a discontinuous reception DRX dormant period that is configured by the base station for the remote user equipment.

Optionally, the request message is a request message used for relay discovery, or the request message is a request message used to set up a direct communication link.

In this embodiment, the base station can determine the relay communication period of the remote user equipment by using the resource request of the remote user equipment, and it can be ensured that the resource allocated to the relay user equipment for sending the response message is definitely a resource in the relay communication period of the remote user equipment. Therefore, it can be ensured that the relay user equipment returns, in the relay communication period of the remote user equipment, the response message corresponding to the request message to the remote user equipment, to avoid a case in which the remote user equipment cannot detect the response message, and to reduce a failure probability of a service requested by the remote user equipment.

Figure 18:
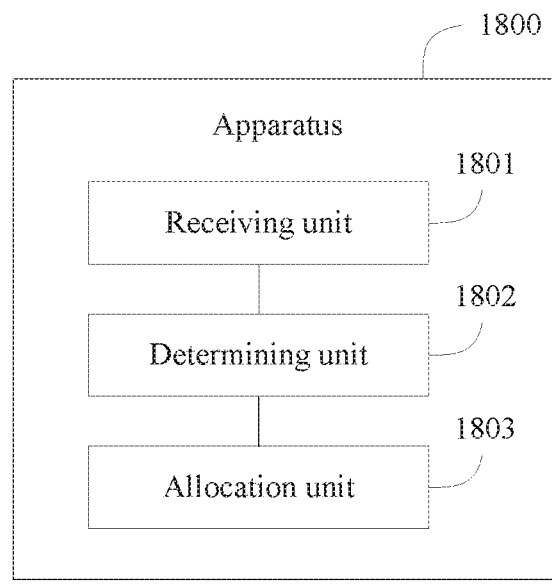
FIG. 18 is a schematic structural diagram of a response message transmission apparatus according to an embodiment of the present invention.

FIG. 18 is a schematic structural diagram of a response message transmission apparatus according to an embodiment of the present invention. An apparatus 1800 in this embodiment may be configured on a base station, and is implemented on the base station. In this embodiment, the apparatus 1800 may specifically include, for example:

a receiving unit 1801, configured to receive a resource request sent by remote user equipment;

a determining unit 1802, configured to determine a relay communication period of the remote user equipment according to the resource request; and an allocation unit 1803, configured to allocate a first target resource and an initial resource that is in the relay communication period to the remote user equipment.

The first target resource is used by the remote user equipment to send, to relay user equipment based on a stored identifier of the relay user equipment, a request message carrying the initial resource, the initial resource is used by the relay user equipment to determine a second target resource, and the second target resource is used by the relay user equipment to send a response message corresponding to the request message to the remote user equipment.

Optionally, the allocation unit 1803 is specifically configured to:

allocate the first target resource to the remote user equipment; and allocate a plurality of resources in the relay communication period to the remote user equipment as initial resources, where the relay user equipment selects the second target resource from the plurality of initial resources.

Optionally, the allocation unit 1803 is specifically configured to:

allocate the first target resource to the remote user equipment and allocate one resource in the relay communication period to the relay user equipment as the initial resource, where the initial resource is a resource that is designated for the relay user equipment as the second target resource.

Optionally, the relay communication period is specifically a discontinuous reception DRX dormant period that is configured by the base station for the remote user equipment.

Optionally, the request message is a request message used for relay discovery, or the request message is a request message used to set up a direct communication link.

In this embodiment, the base station can determine the relay communication period of the remote user equipment by using the resource request of the remote user equipment, and it can be ensured that the resource allocated to the relay user equipment for sending the response message is definitely a resource in the relay communication period of the remote user equipment. Therefore, it can be ensured that the relay user equipment returns, in the relay communication period of the remote user equipment, the response message corresponding to the request message to the remote user equipment, to avoid a case in which the remote user equipment cannot detect the response message, and to reduce a failure probability of a service requested by the remote user equipment.

Figure 19:
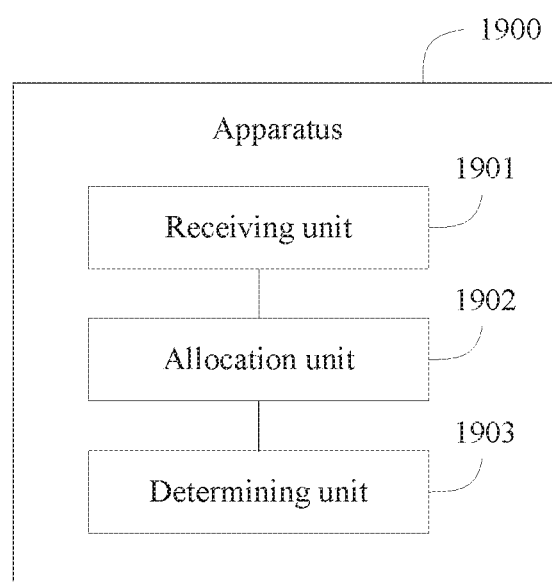
FIG. 19 is a schematic structural diagram of a response message transmission apparatus according to an embodiment of the present invention.

FIG. 19 is a schematic structural diagram of a response message transmission apparatus according to an embodiment of the present invention. An apparatus 1900 in this embodiment may be configured on relay user equipment, and implemented on the relay user equipment. In this embodiment, the apparatus 1900 may specifically include, for example:

a receiving unit 1901, configured to receive a request message that is sent by remote user equipment by using a first target resource, where the request message carries an initial resource, the first target resource and the initial resource are allocated by a base station to the remote user equipment when the base station receives a resource request sent by the remote user equipment, the initial resource belongs to a relay communication period of the remote user equipment, and the relay communication period is determined by the base station according to the resource request;

a determining unit 1902, configured to determine a second target resource based on the initial resource; and a sending unit 1903, configured to send a response message corresponding to the request message to the remote user equipment by using the second target resource.

Optionally, the determining unit 1902 is specifically configured to select one resource from a plurality of initial resources as the second target resource, where the base station allocates, to the remote user equipment, a plurality of initial resources that can be selected and used by the relay user equipment.

Optionally, the determining unit 1902 is specifically configured to determine the initial resource as the second target resource, where the base station allocates, to the relay user equipment, one initial resource that is designated for the relay user equipment.

Optionally, the relay communication period is specifically a discontinuous reception DRX dormant period that is configured by the base station for the remote user equipment.

Optionally, the request message is a request message used for relay discovery, or the request message is a request message used to set up a direct communication link.

Figure 20:
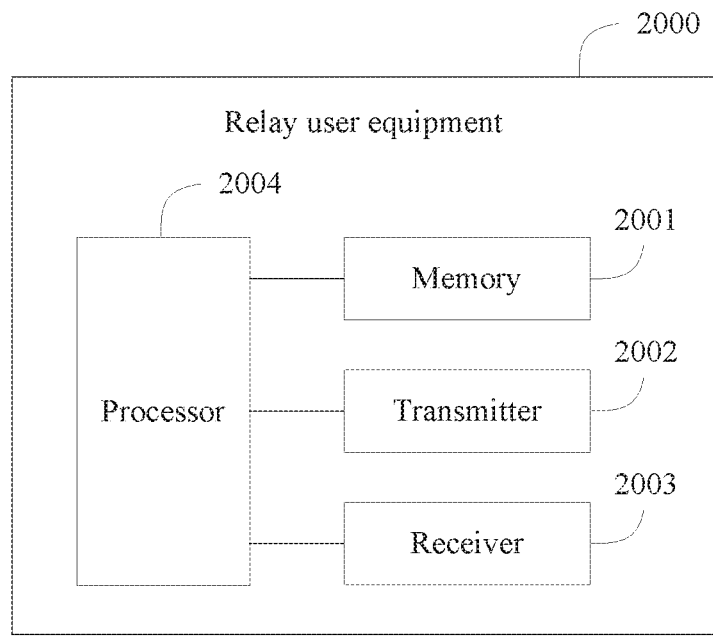
FIG. 20 is a schematic diagram of a hardware structure of relay user equipment according to an embodiment of the present invention.

FIG. 20 is a schematic diagram of a hardware structure of relay user equipment according to an embodiment of the present invention. The relay user equipment 2000 includes a memory 2001, a transmitter 2002, a receiver 2003, and a processor 2004 that is separately connected to the memory 2001, the transmitter 2002, and the receiver 2003. The memory 2001 is configured to store a group of program instructions, and the processor 2004 is configured to invoke the program instructions stored in the memory 2001, to perform the following operations:

triggering the receiver 2003 to receive a request message sent by remote user equipment, where the request message carries indication information;

triggering the transmitter 2002 to send, to a base station, a resource request carrying the indication information, so that the base station determines a relay communication period of the remote user equipment according to the indication information, and allocates a first initial resource in the relay communication period to the relay user equipment; and determining a first target resource based on the first initial resource, and sending a response message corresponding to the request message to the remote user equipment by using the first target resource.

Optionally, the indication information is an identifier of the remote user equipment.

Optionally, the indication information is period configuration information of the remote user equipment, and the period configuration information is used to indicate the relay communication period of the remote user equipment.

Optionally, after triggering the receiver 2003 to receive the request message sent by the remote user equipment, the processor 2004 may further perform the following operations:

if the relay user equipment is in a Radio Resource Control RRC idle mode and stores a second initial resource that is in the relay communication period and that is allocated by the base station, selecting, by the relay user equipment, a second target resource from the second initial resource based on the period configuration information, and triggering the transmitter 2002 to send the response message corresponding to the request message to the remote user equipment by using the second target resource; or if the relay user equipment is in a Radio Resource Control RRC connected mode or does not store a resource that is in the relay communication period and that is allocated by the base station, triggering the transmitter 2002 to send, to the base station, the resource request carrying the indication information.

Optionally, to determine the first target resource based on the first initial resource, the processor 2004 may specifically perform the following operation: selecting one resource from a plurality of first initial resources as the first target resource, where the base station allocates, to the relay user equipment, a plurality of first initial resources that can be selected and used by the relay user equipment.

To determine the first target resource based on the first initial resource, the processor 2004 may specifically perform the following operation: determining the first initial resource as the first target resource, where the base station allocates, to the relay user equipment, one first initial resource that is designated for the relay user equipment.

Optionally, the relay communication period is specifically a discontinuous reception DRX dormant period that is configured by the base station for the remote user equipment, or the relay communication period is specifically a discovery gap that is configured by the base station at the request of the remote user equipment.

Optionally, the request message is a request message used for relay discovery, or the request message is a request message used to set up a direct communication link.

Optionally, the processor 2003 may be a central processing unit (Central Processing Unit, CPU), the memory 2001 may be an internal memory of a random access memory (Random Access Memory, RAM) type, the transmitter 2002 and the receiver 2003 may include a common physical interface, and the physical interface may be an Ethernet (Ethernet) interface or an asynchronous transfer mode (Asynchronous Transfer Mode, ATM) interface. The processor 2004, the receiver 2003, the transmitter 2002, and the memory 2001 may be integrated into one or more independent circuits or hardware, for example, an application-specific integrated circuit (Application-Specific Integrated Circuit, ASIC).

Figure 21:
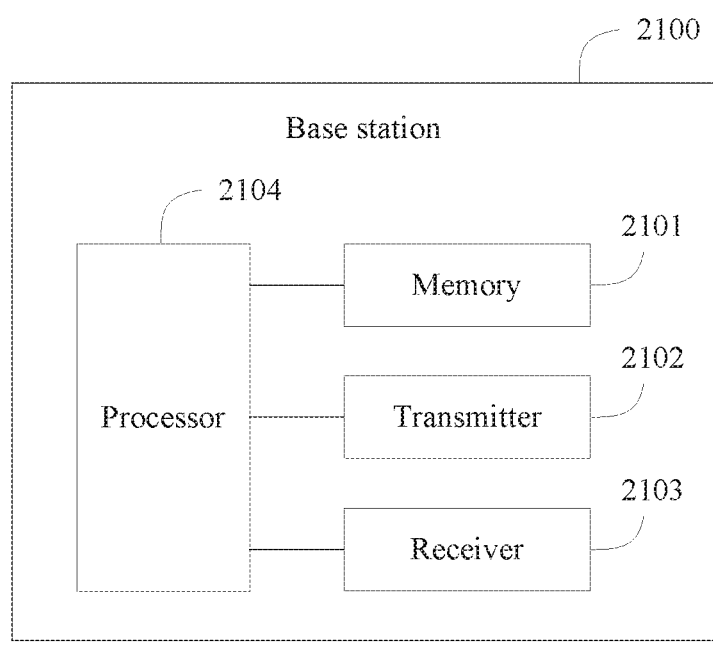
FIG. 21 is a schematic diagram of a hardware structure of a base station according to an embodiment of the present invention.

FIG. 21 is a schematic diagram of a hardware structure of a base station according to an embodiment of the present invention. The base station 2100 includes a memory 2101, a transmitter 2102, a receiver 2103, and a processor 2104 that is separately connected to the memory 2101, the transmitter 2102, and the receiver 2103. The memory 2101 is configured to store a group of program instructions, and the processor 2104 is configured to invoke the program instructions stored in the memory 2101, to perform the following operations:

triggering the receiver 2103 to receive a resource request sent by relay user equipment, where the resource request is triggered by the relay user equipment when the relay user equipment receives a request message sent by remote user equipment, and both the resource request and the request message carry indication information;

determining a relay communication period of the remote user equipment according to the indication information; and triggering the transmitter 2102 to allocate an initial resource in the relay communication period to the relay user equipment, so that the relay user equipment determines a target resource based on the initial resource, and sends a response message corresponding to the request message to the remote user equipment by using the target resource.

Optionally, the indication information is an identifier of the remote user equipment.

Optionally, the indication information is period configuration information of the remote user equipment, and the period configuration information is used to indicate the relay communication period of the remote user equipment.

Optionally, to allocate the initial resource in the relay communication period to the relay user equipment, the processor 2104 may specifically perform the following operation: allocating a plurality of resources in the relay communication period to the relay user equipment as initial resources, where the relay user equipment selects the target resource from the plurality of initial resources.

Optionally, to allocate the initial resource in the relay communication period to the relay user equipment, the processor 2104 may specifically perform the following operation: allocating one resource in the relay communication period to the relay user equipment as the initial resource, where the initial resource is a resource that is designated for the relay user equipment.

Optionally, the relay communication period is specifically a discontinuous reception DRX dormant period that is configured by the base station for the remote user equipment, or the relay communication period is specifically a discovery gap that is configured by the base station at the request of the remote user equipment.

Optionally, the request message is a request message used for relay discovery, or the request message is a request message used to set up a direct communication link.

Optionally, the processor 2103 may be a central processing unit (Central Processing Unit, CPU), the memory 2101 may be an internal memory of a random access memory (Random Access Memory, RAM) type, the transmitter 2102 and the receiver 2103 may include a common physical interface, and the physical interface may be an Ethernet (Ethernet) interface or an asynchronous transfer mode (Asynchronous Transfer Mode, ATM) interface. The processor 2104, the receiver 2103, the transmitter 2102, and the memory 2101 may be integrated into one or more independent circuits or hardware, for example, an application-specific integrated circuit (Application-Specific Integrated Circuit, ASIC).

Figure 22:
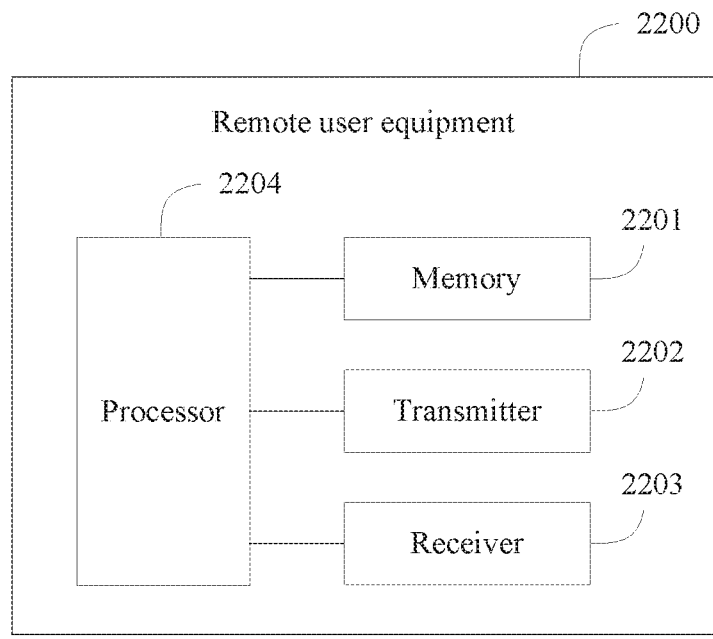
FIG. 22 is a schematic diagram of a hardware structure of remote user equipment according to an embodiment of the present invention.

FIG. 22 is a schematic diagram of a hardware structure of remote user equipment according to an embodiment of the present invention. The remote user equipment 2200 includes a memory 2201, a transmitter 2202, a receiver 2203, and a processor 2204 that is separately connected to the memory 2201, the transmitter 2202, and the receiver 2203. The memory 2201 is configured to store a group of program instructions, and the processor 2204 is configured to invoke the program instructions stored in the memory 2201, to perform the following operations:

triggering the transmitter 2102 to send, to relay user equipment, a request message carrying indication information, where the request message is used to trigger the relay user equipment to send, to a base station, a resource request carrying the indication information, and the resource request is used to trigger the base station to determine a relay communication period of the remote user equipment according to the indication information, and allocate an initial resource in the relay communication period to the relay user equipment; and triggering the receiver 2103 to receive a response message that is sent by the relay user equipment by using a target resource, where the response message corresponds to the request message, and the target resource is determined by the relay user equipment based on the initial resource.

Optionally, the indication information is an identifier of the remote user equipment.

Optionally the indication information is period configuration information of the remote user equipment, and the period configuration information is used to indicate the relay communication period of the remote user equipment.

Optionally, the relay communication period is specifically a discontinuous reception DRX dormant period that is configured by the base station for the remote user equipment, or the relay communication period is specifically a discovery gap that is configured by the base station at the request of the remote user equipment.

Optionally, the request message is a request message used for relay discovery, or the request message is a request message used to set up a direct communication link.

Optionally, the processor 2203 may be a central processing unit (Central Processing Unit, CPU), the memory 2201 may be an internal memory of a random access memory (Random Access Memory, RAM) type, the transmitter 2202 and the receiver 2203 may include a common physical interface, and the physical interface may be an Ethernet (Ethernet) interface or an asynchronous transfer mode (Asynchronous Transfer Mode, ATM) interface. The processor 2204, the receiver 2203, the transmitter 2202, and the memory 2201 may be integrated into one or more independent circuits or hardware, for example, an application-specific integrated circuit (Application-Specific Integrated Circuit, ASIC).

Figure 23:
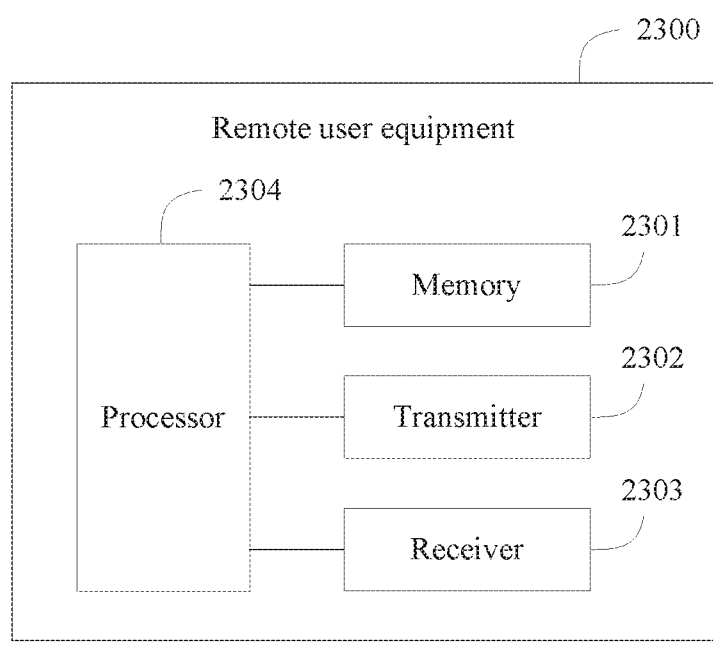
FIG. 23 is a schematic diagram of a hardware structure of remote user equipment according to an embodiment of the present invention.

FIG. 23 is a schematic diagram of a hardware structure of remote user equipment according to an embodiment of the present invention. The remote user equipment 2300 includes a memory 2301, a transmitter 2302, a receiver 2303, and a processor 2304 that is separately connected to the memory 2301, the transmitter 2302, and the receiver 2303. The memory 2301 is configured to store a group of program instructions, and the processor 2304 is configured to invoke the program instructions stored in the memory 2301, to perform the following operations:

triggering the transmitter 2302 to send a resource request to a base station, so that the base station determines a relay communication period of the remote user equipment according to the resource request, and allocates a first target resource and an initial resource that is in the relay communication period to the remote user equipment;

triggering the transmitter 2302 to send, to relay user equipment based on a stored identifier of the relay user equipment and by using the first target resource, a request message carrying the initial resource, so that the relay user equipment determines the second target resource based on the initial resource; and triggering the receiver 2303 to receive a response message that is sent by the relay user equipment by using the second target resource, where the response message corresponds to the request message.

Optionally, the base station allocates, to the relay user equipment, a plurality of initial resources that can be selected and used by the relay user equipment, and the relay user equipment selects the second target resource from the plurality of initial resources.

Optionally, the base station allocates, to the relay user equipment, one initial resource that is designated for the relay user equipment, and the initial resource is a resource that is designated for the relay user equipment as the second target resource.

Optionally, the relay communication period is specifically a discontinuous reception DRX dormant period that is configured by the base station for the remote user equipment.

Optionally, the request message is a request message used for relay discovery, or the request message is a request message used to set up a direct communication link.

Optionally, the processor 2303 may be a central processing unit (Central Processing Unit, CPU), the memory 2301 may be an internal memory of a random access memory (Random Access Memory, RAM) type, the transmitter 2302 and the receiver 2303 may include a common physical interface, and the physical interface may be an Ethernet (Ethernet) interface or an asynchronous transfer mode (Asynchronous Transfer Mode, ATM) interface. The processor 2304, the receiver 2303, the transmitter 2302, and the memory 2301 may be integrated into one or more independent circuits or hardware, for example, an application-specific integrated circuit (Application-Specific Integrated Circuit, ASIC).

Figure 24:
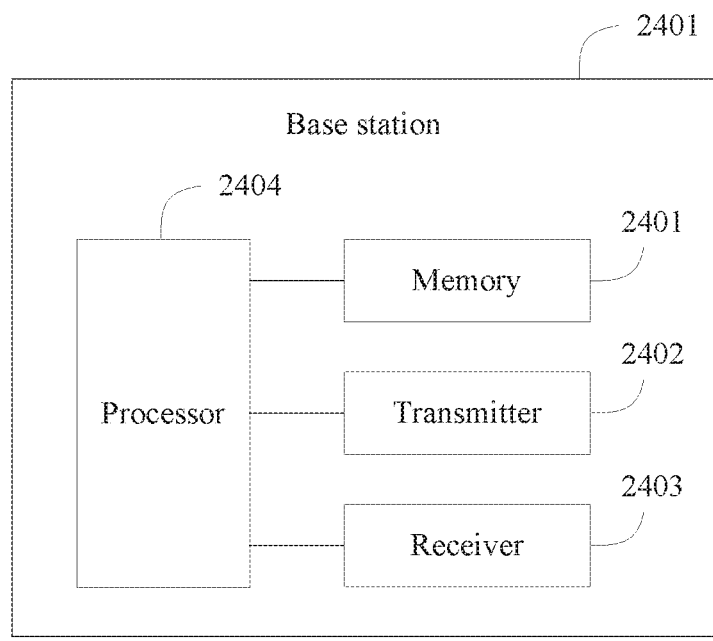
FIG. 24 is a schematic diagram of a hardware structure of a base station according to an embodiment of the present invention.

FIG. 24 is a schematic diagram of a hardware structure of a base station according to an embodiment of the present invention. The base station 2400 includes a memory 2401, a transmitter 2402, a receiver 2403, and a processor 2404 that is separately connected to the memory 2401, the transmitter 2402, and the receiver 2403. The memory 2401 is configured to store a group of program instructions, and the processor 2404 is configured to invoke the program instructions stored in the memory 2401, to perform the following operations:

triggering the receiver 2403 to receive a resource request sent by remote user equipment;

determining a relay communication period of the remote user equipment according to the resource request; and triggering the transmitter 2402 to allocate a first target resource and an initial resource that is in the relay communication period to the remote user equipment.

The first target resource is used by the remote user equipment to send, to relay user equipment based on a stored identifier of the relay user equipment, a request message carrying the initial resource, the initial resource is used by the relay user equipment to determine a second target resource, and the second target resource is used by the relay user equipment to send a response message corresponding to the request message to the remote user equipment.

Optionally, to allocate the first target resource and the initial resource that is in the relay communication period to the remote user equipment, the processor 2404 may specifically perform the following operations:

allocating the first target resource to the remote user equipment; and allocating a plurality of resources in the relay communication period to the remote user equipment as initial resources, where the relay user equipment selects the second target resource from the plurality of initial resources.

Optionally, to allocate the first target resource and the initial resource that is in the relay communication period to the remote user equipment, the processor 2404 may specifically perform the following operations:

allocating the first target resource to the remote user equipment; and allocating one resource in the relay communication period to the relay user equipment as the initial resource, where the initial resource is a resource that is designated for the relay user equipment as the second target resource.

Optionally, the relay communication period is specifically a discontinuous reception DRX dormant period that is configured by the base station for the remote user equipment.

Optionally, the request message is a request message used for relay discovery, or the request message is a request message used to set up a direct communication link.

Optionally, the processor 2403 may be a central processing unit (Central Processing Unit, CPU), the memory 2401 may be an internal memory of a random access memory (Random Access Memory, RAM) type, the transmitter 2402 and the receiver 2403 may include a common physical interface, and the physical interface may be an Ethernet (Ethernet) interface or an asynchronous transfer mode (Asynchronous Transfer Mode, ATM) interface. The processor 2404, the receiver 2403, the transmitter 2402, and the memory 2401 may be integrated into one or more independent circuits or hardware, for example, an application-specific integrated circuit (Application-Specific Integrated Circuit, ASIC).

Figure 25:
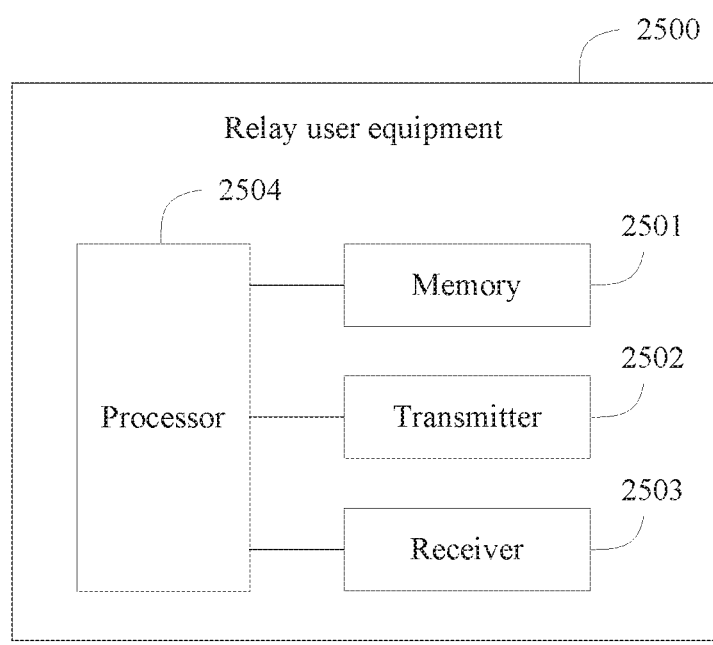
FIG. 25 is a schematic diagram of a hardware structure of remote user equipment according to an embodiment of the present invention.

FIG. 25 is a schematic diagram of a hardware structure of relay user equipment according to an embodiment of the present invention. The relay user equipment 2500 includes a memory 2501, a transmitter 2502, a receiver 2503, and a processor 2504 that is separately connected to the memory 2501, the transmitter 2502, and the receiver 2503. The memory 2501 is configured to store a group of program instructions, and the processor 2504 is configured to invoke the program instructions stored in the memory 2501, to perform the following operations:

triggering the receiver 2503 to receive a request message that is sent by remote user equipment by using a first target resource, where the request message carries an initial resource, the first target resource and the initial resource are allocated by a base station to the remote user equipment when the base station receives a resource request sent by the remote user equipment, the initial resource belongs to a relay communication period of the remote user equipment, and the relay communication period is determined by the base station according to the resource request; and determining a second target resource based on the initial resource, and sending a response message corresponding to the request message to the remote user equipment by using the second target resource.

Optionally, to determine the second target resource based on the initial resource, the processor 2504 may specifically perform the following operation: selecting one resource from a plurality of initial resources as the second target resource, where the base station allocates, to the remote user equipment, a plurality of initial resources that can be selected and used by the relay user equipment.

Optionally, to determine the second target resource based on the initial resource, the processor 2504 may specifically perform the following operation: determining the initial resource as the second target resource, where the base station allocates, to the relay user equipment, one initial resource that is designated for the relay user equipment.

Optionally, the relay communication period is specifically a discontinuous reception DRX dormant period that is configured by the base station for the remote user equipment.

Optionally, the request message is a request message used for relay discovery, or the request message is a request message used to set up a direct communication link.

Optionally, the processor 2403 may be a central processing unit (Central Processing Unit, CPU), the memory 2401 may be an internal memory of a random access memory (Random Access Memory, RAM) type, the transmitter 2402 and the receiver 2403 may include a common physical interface, and the physical interface may be an Ethernet (Ethernet) interface or an asynchronous transfer mode (Asynchronous Transfer Mode, ATM) interface. The processor 2404, the receiver 2403, the transmitter 2402, and the memory 2401 may be integrated into one or more independent circuits or hardware, for example, an application-specific integrated circuit (Application-Specific Integrated Circuit, ASIC).

"First" in the terms such as the "first initial resource", the "first target resource", and the "first sending unit" in the embodiments of the present invention is merely used to identify the terms, but does not represent the first in sequence. The rule is also applicable to "second", "third", and the like.

It can be learned from the foregoing descriptions of the implementations that a person skilled in the art may clearly understand that all or some steps of the methods in the embodiments may be implemented by software plus a universal hardware platform. Based on such an understanding, the technical solutions of the present invention may be implemented in a form of a software product. The computer software product may be stored in a storage medium, such as a read-only memory (English: read-only memory, ROM)/RAM, a magnetic disk, or an optical disc, and includes several instructions for instructing a computer device (which may be a personal computer, a server, or a network communications device such as a router) to perform the methods described in the embodiments or some parts of the embodiments of the present invention.

The embodiments in this specification are all described in a progressive manner. For same or similar parts in the embodiments, refer to these embodiments. Each embodiment focuses on a difference from other embodiments. Especially, method and apparatus embodiments are basically similar to a system embodiment, and therefore are described briefly. For related parts, refer to some descriptions in the system embodiment. The described device and system embodiments are merely examples. The modules described as separate parts may or may not be physically separate, and parts displayed as modules may or may not be physical modules, may be located in one position, or may be distributed on a plurality of network units. Some or all modules may be selected according to actual needs to achieve the objectives of the solutions of the embodiments. A person of ordinary skill in the art may understand and implement the embodiments of the present invention without creative efforts.

The foregoing descriptions are merely example implementations of the present invention, but are not intended to limit the protection scope of the present invention. It should be noted that a person of ordinary skill in the art may make improvements and polishing without departing from the present invention and the improvements and polishing shall fall within the protection scope of this application.

What is claimed is:

1. A response message transmission method, comprising:
   receiving, by a relay user equipment, a request message from a remote user equipment, wherein the request message carries indication information;
   sending, by the relay user equipment to a base station, a resource request carrying the indication information to prompt the base station to determine a relay communication period of the remote user equipment according to the indication information and to allocate a first initial resource in the relay communication period to the relay user equipment, wherein the relay communication period is a period of time used by the relay user equipment to communicate with the remote user equipment to allow the remote user equipment to access the base station through the relay user equipment;
   determining, by the relay user equipment, a first target resource based on the first initial resource; and
   sending, by the relay user equipment, a response message corresponding to the request message to the remote user equipment using the first target resource in the relay communication period.

2. The method of claim 1, wherein the indication information is an identifier of the remote user equipment.

3. The method of claim 1, wherein the indication information is period configuration information of the remote user equipment, and wherein the period configuration information indicates the relay communication period of the remote user equipment.

4. The method of claim 3, wherein after receiving, by the relay user equipment, the request message from the remote user equipment, the method further comprises, when the relay user equipment is in a Radio Resource Control (RRC) idle mode and stores a second initial resource that is in the relay communication period and that is allocated by the base station, selecting, by the relay user equipment, a second target resource from the second initial resource based on the period configuration information, and sending the response message corresponding to the request message to the remote user equipment using the second target resource.

5. The method of claim 1, wherein determining, by the relay user equipment, the first target resource based on the first initial resource comprises selecting, by the relay user equipment, one resource from a plurality of first initial resources as the first target resource, and wherein the base station allocates, to the relay user equipment, the plurality of first initial resources that can be selected and used by the relay user equipment.

6. The method of claim 1, wherein determining, by the relay user equipment, the first target resource based on the first initial resource comprises determining, by the relay user equipment, the first initial resource as the first target resource, and wherein the base station allocates, to the relay user equipment, one first initial resource designated for the relay user equipment.

7. The method of claim 1, wherein the relay communication period is a discontinuous reception (DRX) dormant period that is configured by the base station for the remote user equipment.

8. A response message transmission method, comprising:
   receiving, by a base station, a resource request from a relay user equipment, wherein the resource request is triggered by the relay user equipment when the relay user equipment receives a request message from a remote user equipment, and wherein both the resource request and the request message carry indication information;
   determining, by the base station, a relay communication period of the remote user equipment according to the indication information, wherein the relay communication period is a period of time allocated for communications between the remote user equipment and the relay user equipment to allow the remote user equipment to access the base station through the relay user equipment; and
   allocating, by the base station, an initial resource in the relay communication period to the relay user equipment to prompt the relay user equipment to determine a target resource based on the initial resource and send a response message corresponding to the request message to the remote user equipment using the target resource in the relay communication period.

9. The method of claim 8, wherein allocating, by the base station, the initial resource in the relay communication period to the relay user equipment comprises allocating, by the base station, a plurality of resources in the relay communication period to the relay user equipment as initial resources, and wherein the relay user equipment selects the target resource from the plurality of initial resources.

10. A response message transmission method, comprising:
    sending, by a remote user equipment to a relay user equipment, a request message carrying indication information, wherein the request message triggers the relay user equipment to send, to a base station, a resource request carrying the indication information, wherein the resource request triggers the base station to determine a relay communication period of the remote user equipment according to the indication information, and allocate an initial resource in the relay communication period to the relay user equipment, and wherein the relay communication period is a period of time used by the remote user equipment to communicate with the relay user equipment to allow the remote user equipment to access the base station through the relay user equipment; and receiving, by the remote user equipment, a response message that is from the relay user equipment using a target resource in the relay communication period, wherein the response message corresponds to the request message, and wherein the target resource is based on the initial resource.

11. The method of claim 10, wherein the indication information is an identifier of the remote user equipment.

12. The method of claim 10, wherein the indication information is period configuration information of the remote user equipment, and wherein the period configuration information indicates the relay communication period of the remote user equipment.

13. A response message transmission method, comprising:

sending, by a remote user equipment, a resource request to a base station to prompt the base station to determine a relay communication period of the remote user equipment based on the resource request and to allocate a first target resource and an initial resource in the relay communication period, wherein the relay communication period is a period of time used by the remote user equipment to communicate with a relay user equipment to allow the remote user equipment to access the base station through the relay user equipment;

sending, by the remote user equipment to the relay user equipment based on a stored identifier of the relay user equipment and using the first target resource, a request message carrying the initial resource to prompt the relay user equipment to determine a second target resource based on the initial resource; and receiving, by the remote user equipment, a response message that is from the relay user equipment using the second target resource in the relay communication period, wherein the response message corresponds to the request message.

14. The method of claim 13, wherein the base station allocates, to the relay user equipment, a plurality of initial resources that can be selected and used by the relay user equipment, wherein the relay user equipment selects the second target resource from the plurality of initial resources, wherein one initial resource is designated for the relay user equipment, and wherein the initial resource is a resource that is designated for the relay user equipment as the second target resource.

15. A response message transmission method, comprising:

receiving, by a base station, a resource request from a remote user equipment;

determining, by the base station, a relay communication period of the remote user equipment based on the remote user equipment corresponding to the resource request, wherein the relay communication period is a period of time allocated for communications between the remote user equipment and a relay user equipment to allow the remote user equipment to access the base station through the relay user equipment; and allocating, by the base station, a first target resource and an initial resource in the relay communication period to the remote user equipment, wherein the first target resource is allocated to the remote user equipment to send, to the relay user equipment based on a stored identifier of the relay user equipment, a request message carrying the initial resource, wherein the initial resource is allocated to the relay user equipment to determine a second target resource to send in the relay communication period a response message corresponding to the request message to the remote user equipment.

16. The method of claim 15, wherein allocating, by the base station, the first target resource and the initial resource that is in the relay communication period to the remote user equipment further comprises:

allocating, by the base station, the first target resource to the remote user equipment; and allocating, by the base station, a plurality of resources in the relay communication period to the remote user equipment as initial resources, wherein the relay user equipment selects the second target resource from the plurality of initial resources.

17. The method of claim 15, wherein allocating, by the base station, the first target resource and the initial resource that is in the relay communication period to the remote user equipment further comprises:

allocating, by the base station, the first target resource to the remote user equipment; and allocating, by the base station, one resource in the relay communication period to the relay user equipment as the initial resource, wherein the initial resource is a resource that is designated for the relay user equipment as the second target resource.

18. The method of claim 3, wherein after receiving, by the relay user equipment, the request message from the remote user equipment, the method further comprises sending, by the relay user equipment to the base station when the relay user equipment is in a RRC connected mode or does not store a resource that is in the relay communication period and that is allocated by the base station, the resource request carrying the indication information.

19. The method of claim 1, wherein the relay communication period is a discovery gap that is configured by the base station at a request of the remote user equipment.

20. The method of claim 8, wherein allocating, by the base station, the initial resource in the relay communication period to the relay user equipment comprises allocating, by the base station, a plurality of resources in the relay communication period to the relay user equipment as initial resources, and wherein the initial resource is a resource designated for the relay user equipment.

* * * * *